US011926028B2

(12) United States Patent
Wyler et al.

(10) Patent No.: US 11,926,028 B2
(45) Date of Patent: *Mar. 12, 2024

(54) GAS SPRING-POWERED FASTENER DRIVER

(71) Applicant: MILWAUKEE ELECTRIC TOOL CORPORATION, Brookfield, WI (US)

(72) Inventors: Andrew R. Wyler, Pewaukee, WI (US); Nathan T. Armstrong, Fox Point, WI (US); Jason D. Thurner, Menomonee Falls, WI (US); Troy C. Thorson, Cedarburg, WI (US); John S. Scott, Brookfield, WI (US); Jeremy R. Ebner, Milwaukee, WI (US); Daniel R. Garces, Waukesha, WI (US); Ryan Allen Dedrickson, Sussex, WI (US); Luke J. Skinner, West Bend, WI (US); Benjamin R. Suhr, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 211 days.

This patent is subject to a terminal disclaimer.

(21) Appl. No.: 17/382,972

(22) Filed: Jul. 22, 2021

(65) Prior Publication Data

US 2021/0347026 A1 Nov. 11, 2021

Related U.S. Application Data

(63) Continuation of application No. 16/201,111, filed on Nov. 27, 2018, now Pat. No. 11,072,058, which is a (Continued)

(51) Int. Cl.

*B25C 1/04* (2006.01)
*B25C 1/06* (2006.01)

(52) U.S. Cl.

CPC ................ *B25C 1/06* (2013.01); *B25C 1/047* (2013.01)

(58) Field of Classification Search

CPC ................................. B25C 1/06; B25C 1/047

(Continued)

(56) References Cited

U.S. PATENT DOCUMENTS

| | | | |
|---|---|---|---|
| 2,575,455 | A | 11/1951 | Lang |
| 2,814,041 | A | 11/1957 | Haley |

(Continued)

FOREIGN PATENT DOCUMENTS

| | | | |
|---|---|---|---|
| CN | 202702169 | U | 1/2013 |
| EP | 1072363 | | 1/2001 |
| JP | 2010221356 | | 10/2010 |

OTHER PUBLICATIONS

European Patent Office Search Report for Application No. 16747367.7 dated Sep. 25, 2018, 8 pages.

(Continued)

*Primary Examiner* — Robert F Long

(74) *Attorney, Agent, or Firm* — Michael Best & Friedrich LLP

(57) ABSTRACT

A gas spring-powered fastener driver includes a cylinder, a moveable piston positioned within the cylinder, a driver blade attached to the piston and movable therewith between a ready position and a driven position, a lifter to move the driver blade from the driven position to the ready position, and a transmission including an output shaft operatively coupled to the lifter to provide torque to the lifter. The fastener driver also includes an input to provide torque to the transmission and a clutch positioned downstream of the input and operably coupled to the output shaft to limit an amount of torque transferred to the output shaft and the lifter. In response to an application of a reaction torque to the (Continued)

output shaft above a predetermined threshold, torque from the input is diverted from the output shaft via the clutch.

23 Claims, 16 Drawing Sheets

Related U.S. Application Data continuation of application No. 15/017,291, filed on Feb. 5, 2016, now Pat. No. 10,173,310.

(60) Provisional application No. 62/279,408, filed on Jan. 15, 2016, provisional application No. 62/240,801, filed on Oct. 13, 2015, provisional application No. 62/113,050, filed on Feb. 6, 2015.

(58) Field of Classification Search
USPC .......................... 227/107, 140; 173/200–212
See application file for complete search history.

(56) References Cited

U.S. PATENT DOCUMENTS 3,203,610 A 8/1965 Farrell
3,278,105 A 10/1966 Juilfs et al.
3,299,967 A 1/1967 Cabot et al.
3,552,627 A 1/1971 Moreno
3,568,908 A 3/1971 Bader
3,583,498 A 6/1971 Dorm
3,589,588 A 6/1971 Vasku
3,847,322 A 11/1974 Smith
3,924,692 A 12/1975 Saari
3,964,659 A 6/1976 Eiben et al.
3,967,771 A 7/1976 Smith
4,034,817 A 7/1977 Okada
4,129,240 A * 12/1978 Geist ........................ B25C 1/06 227/8
4,139,137 A 2/1979 Gupta
4,182,022 A 1/1980 Kristiansson
4,197,974 A 4/1980 Morton et al.
4,206,687 A 6/1980 Klaus et al.
4,215,808 A 8/1980 Sollberger et al.
4,251,017 A 2/1981 Doyle et al.
4,253,598 A 3/1981 Haytayan
4,304,349 A 12/1981 Novak et al.
4,305,541 A 12/1981 Barrett et al.
4,327,858 A 5/1982 Powers
4,367,837 A 1/1983 Manino
4,436,236 A 3/1984 Jobe
4,467,952 A 8/1984 Morrell, Jr.
4,483,473 A 11/1984 Wagdy
4,558,747 A 12/1985 Cunningham
4,597,517 A 7/1986 Wagdy
4,610,381 A 9/1986 Kramer et al.
4,641,772 A 2/1987 Skuthan
4,688,710 A 8/1987 Massari, Jr. et al.
4,724,992 A 2/1988 Ohmori
4,767,043 A 8/1988 Canlas, Jr.
4,801,062 A 1/1989 Austin
4,815,647 A 3/1989 Chou
4,821,938 A 4/1989 Haytayan
4,858,812 A 8/1989 Fealey
4,903,880 A 2/1990 Austin et al.
4,909,419 A 3/1990 Yamada et al.
4,932,480 A 6/1990 Golsch
4,942,996 A 7/1990 Wolfberg et al.
5,031,742 A * 7/1991 Dischler ................ F16D 43/20 192/56.52
5,038,993 A 8/1991 Schafer et al.
5,083,694 A 1/1992 Lemos
5,163,596 A 11/1992 Ravoo et al.
5,191,861 A 3/1993 Kellerman et al.
5,205,457 A 4/1993 Blomquist, Jr.
5,238,168 A 8/1993 Oda
5,273,200 A 12/1993 Hoefler
5,290,014 A * 3/1994 Fergison, Jr. ........ B62D 43/045 242/396.2
5,297,713 A 3/1994 Perra et al.
5,299,848 A * 4/1994 Boyer .................. B23K 11/317 294/198
5,320,270 A 6/1994 Crutcher
5,350,103 A 9/1994 Monacelli
5,366,412 A * 11/1994 Beaty ...................... F16D 7/044 464/37
5,368,213 A 11/1994 Massari, Jr. et al.
5,375,664 A 12/1994 McDowell
5,385,286 A 1/1995 Johnson, Jr.
5,398,861 A 3/1995 Green
5,433,367 A 7/1995 Liu
5,503,319 A 4/1996 Lai
5,522,533 A 6/1996 Mukoyama et al.
5,558,264 A 9/1996 Weinstein
5,564,614 A 10/1996 Yang
5,579,977 A 12/1996 Yang
5,649,660 A 7/1997 Akiba et al.
5,664,722 A 9/1997 Marks
5,683,024 A 11/1997 Eminger et al.
5,687,898 A 11/1997 Toulouse
5,715,982 A 2/1998 Adachi
5,720,423 A 2/1998 Kondo et al.
5,775,201 A 7/1998 Tanji et al.
5,785,227 A 7/1998 Akiba
5,799,855 A 9/1998 Veoukas
5,803,338 A 9/1998 Singer et al.
5,816,121 A 10/1998 Yoshimizu et al.
5,816,468 A 10/1998 Yang
5,839,638 A 11/1998 Ronn
5,894,981 A * 4/1999 Kelly .................. B23K 20/004 228/180.5
5,911,351 A 6/1999 White
5,927,585 A 7/1999 Moorman et al.
5,941,441 A 8/1999 Ilagan
6,024,267 A 2/2000 Chen
6,053,389 A 4/2000 Chu et al.
6,116,489 A 9/2000 Branston
6,145,724 A 11/2000 Shkolnikov et al.
6,145,727 A 11/2000 Mukoyama et al.
D435,769 S 1/2001 Etter et al.
6,170,729 B1 1/2001 Lin
6,189,759 B1 2/2001 Canlas et al.
6,199,739 B1 3/2001 Mukoyama et al.
6,210,300 B1 4/2001 Costin et al.
6,269,996 B1 8/2001 McAllister
6,290,115 B1 9/2001 Chen
6,371,348 B1 4/2002 Canlas et al.
6,427,896 B1 8/2002 Ho et al.
6,431,429 B1 8/2002 Canlas et al.
6,450,387 B1 9/2002 Chen
6,454,151 B1 9/2002 Wang-Kuan
6,527,156 B2 3/2003 McAllister et al.
6,557,745 B2 5/2003 Wang
6,581,815 B1 6/2003 Ho et al.
6,592,014 B2 7/2003 Smolinski
6,592,016 B2 7/2003 Hamano et al.
6,609,646 B2 8/2003 Miller et al.
6,641,022 B2 11/2003 Hamano et al.
6,651,862 B2 11/2003 Driscoll et al.
6,655,472 B1 12/2003 Humm et al.
6,679,413 B2 1/2004 Miller et al.
6,679,414 B2 1/2004 Rotharmel
6,695,192 B1 2/2004 Kwok
6,705,410 B2 * 3/2004 Ziegler ................ B25D 16/003 173/217
6,763,992 B2 7/2004 Hirai
6,769,591 B2 8/2004 Yamamoto et al.
6,779,698 B2 8/2004 Lin
6,779,699 B2 8/2004 Aoki
6,786,380 B2 9/2004 Driscoll et al.
6,834,788 B2 12/2004 Popovich et al.
6,851,595 B1 2/2005 Lee
6,866,177 B1 3/2005 Chen
6,883,696 B1 4/2005 Steinbrunner et al.
6,902,092 B2 6/2005 Osuga et al.
6,908,021 B1 6/2005 Wang

(56) References Cited

U.S. PATENT DOCUMENTS

| | | | | |
|---|---|---|---|---|
| 6,929,165 | B1 | 8/2005 | Chen et al. | |
| 6,938,812 | B2 | 9/2005 | Miller et al. | |
| 6,938,813 | B1 | 9/2005 | Chen | |
| RE38,834 | E | 10/2005 | Perra | |
| 6,953,137 | B2 | 10/2005 | Nakano et al. | |
| 6,966,477 | B1 | 11/2005 | Chien-Kuo et al. | |
| 6,997,367 | B2 | 2/2006 | Hu | |
| 7,004,368 | B1 | 2/2006 | Chen | |
| 7,021,511 | B2 | 4/2006 | Popovich et al. | |
| 7,032,794 | B1 | 4/2006 | Hung et al. | |
| 7,040,522 | B2 | 5/2006 | Osuga et al. | |
| 7,055,727 | B2 | 6/2006 | Rohrmoser et al. | |
| 7,059,507 | B2 | 6/2006 | Almera et al. | |
| 7,070,079 | B2 | 7/2006 | Smolinski et al. | |
| 7,070,081 | B2 | 7/2006 | Tadayoshi et al. | |
| 7,070,082 | B2 | 7/2006 | Ronconi | |
| 7,086,573 | B1 | 8/2006 | Wen | |
| 7,097,084 | B2 | 8/2006 | Ho | |
| 7,131,563 | B2 | 11/2006 | Wen | |
| 7,134,586 | B2 | 11/2006 | McGee et al. | |
| 7,137,540 | B2 | 11/2006 | Terrell et al. | |
| 7,140,524 | B2 | 11/2006 | Hung et al. | |
| 7,152,774 | B2 | 12/2006 | Chen | |
| 7,175,063 | B2 | 2/2007 | Osuga et al. | |
| 7,175,064 | B2 | 2/2007 | Schell et al. | |
| 7,185,712 | B2 | 3/2007 | Miller et al. | |
| 7,213,732 | B2 | 5/2007 | Schell et al. | |
| 7,213,733 | B1 | 5/2007 | Wen | |
| 7,255,256 | B2 | 8/2007 | McGee et al. | |
| 7,278,561 | B2 | 10/2007 | Schnell et al. | |
| 7,284,685 | B1 | 10/2007 | Wojcicki | |
| 7,299,959 | B2 | 11/2007 | Ishizawa et al. | |
| 7,316,341 | B2 | 1/2008 | Schnell et al. | |
| 7,318,546 | B2 | 1/2008 | Segura et al. | |
| 7,320,422 | B2 | 1/2008 | Schell et al. | |
| 7,325,709 | B2 | 2/2008 | Ishizawa et al. | |
| 7,328,826 | B2 | 2/2008 | Shkolnikov | |
| 7,341,172 | B2 | 3/2008 | Moore et al. | |
| 7,383,974 | B2 | 6/2008 | Moeller et al. | |
| 7,410,085 | B2 | 8/2008 | Wolf et al. | |
| 7,413,103 | B1 | 8/2008 | Ho et al. | |
| 7,431,187 | B2 | 10/2008 | Tachihara et al. | |
| 7,441,683 | B2 | 10/2008 | Ishizawa et al. | |
| 7,458,492 | B2 | 12/2008 | Terrell et al. | |
| 7,469,811 | B2 | 12/2008 | Shima et al. | |
| 7,484,649 | B2 | 2/2009 | Schnell et al. | |
| 7,490,747 | B2 | 2/2009 | Kitagawa | |
| 7,494,037 | B2 | 2/2009 | Simonelli et al. | |
| 7,503,473 | B2 | 3/2009 | Niblett et al. | |
| 7,506,787 | B2 | 3/2009 | Wu et al. | |
| 7,513,403 | B2 | 4/2009 | Fujimoto | |
| 7,516,532 | B2 | 4/2009 | Wojcicki | |
| 7,520,414 | B2 | 4/2009 | Blessing et al. | |
| 7,527,106 | B2 | 5/2009 | Miller et al. | |
| 7,527,184 | B2 | 5/2009 | Shao | |
| 7,537,145 | B2 | 5/2009 | Gross et al. | |
| 7,537,146 | B2 | 5/2009 | Schiestl | |
| 7,543,728 | B2 | 6/2009 | Spasov et al. | |
| 7,565,989 | B2 | 7/2009 | Lai et al. | |
| 7,571,844 | B2 | 8/2009 | Bromley et al. | |
| 7,594,598 | B2 | 9/2009 | Chen et al. | |
| 7,641,088 | B2 | 1/2010 | Wang | |
| 7,641,089 | B2 | 1/2010 | Schell et al. | |
| RE41,265 | E | 4/2010 | Perra et al. | |
| 7,694,863 | B2 | 4/2010 | Spasov et al. | |
| 7,703,648 | B2 | 4/2010 | Tamura et al. | |
| 7,721,927 | B2 | 5/2010 | Osuga | |
| 7,726,533 | B2 | 6/2010 | Wojcicki | |
| 7,748,588 | B2 | 7/2010 | Osuga et al. | |
| 7,828,506 | B1 * | 11/2010 | Young | B66F 3/00 254/342 |
| 7,922,054 | B2 | 4/2011 | Cole, Jr. | |
| 7,938,305 | B2 | 5/2011 | Simonelli et al. | |
| 7,950,556 | B2 | 5/2011 | Hagan | |
| 7,971,768 | B2 | 7/2011 | Wywialowski et al. | |
| 7,975,777 | B2 | 7/2011 | Krondorfer et al. | |
| 7,980,439 | B2 | 7/2011 | Akiba et al. | |
| 7,988,025 | B2 | 8/2011 | Terrell | |
| 8,006,882 | B2 | 8/2011 | Kameda et al. | |
| 8,006,883 | B2 | 8/2011 | Schell et al. | |
| 8,011,441 | B2 * | 9/2011 | Leimbach | B25C 1/041 227/129 |
| 8,011,547 | B2 | 9/2011 | Leimbach et al. | |
| 8,016,046 | B2 | 9/2011 | Zhao et al. | |
| 8,037,947 | B2 | 10/2011 | Miwa | |
| 8,047,414 | B2 | 11/2011 | Kunz et al. | |
| 8,066,165 | B2 | 11/2011 | Ishizawa et al. | |
| 8,074,855 | B2 | 12/2011 | Johnson | |
| 8,192,126 | B1 * | 6/2012 | Young | B66D 1/14 254/375 |
| 8,220,686 | B2 | 7/2012 | Kestner et al. | |
| 8,230,941 | B2 | 7/2012 | Leimbach et al. | |
| 8,267,297 | B2 | 9/2012 | Leimbach et al. | |
| 8,286,722 | B2 | 10/2012 | Leimbach et al. | |
| 8,292,143 | B2 | 10/2012 | Lee et al. | |
| 8,292,144 | B2 | 10/2012 | Mal.tais et al. | |
| 8,317,069 | B2 | 11/2012 | Zhang et al. | |
| 8,336,748 | B2 | 12/2012 | Hlinka et al. | |
| 8,371,488 | B2 | 2/2013 | Hahn et al. | |
| 8,387,718 | B2 | 3/2013 | Leimbach et al. | |
| 8,408,327 | B2 | 4/2013 | Forster et al. | |
| 8,453,901 | B2 | 6/2013 | Suda | |
| 8,453,902 | B2 | 6/2013 | Jang | |
| 8,485,407 | B2 | 7/2013 | Liu et al. | |
| 8,485,410 | B1 | 7/2013 | Harshman | |
| 8,499,991 | B2 | 8/2013 | Spasov et al. | |
| 8,505,798 | B2 | 8/2013 | Simonelli et al. | |
| 8,544,561 | B2 | 10/2013 | Aihara | |
| 8,550,324 | B2 | 10/2013 | Coleman | |
| 8,556,148 | B2 | 10/2013 | Schell et al. | |
| 8,556,149 | B2 | 10/2013 | Schnell et al. | |
| 8,556,150 | B2 | 10/2013 | Spasov et al. | |
| 8,561,869 | B2 | 10/2013 | Towfichi | |
| 8,596,512 | B2 | 12/2013 | Zhou et al. | |
| 8,602,282 | B2 | 12/2013 | Leimbach et al. | |
| 8,640,939 | B2 | 2/2014 | Ferrier | |
| 8,690,036 | B2 | 4/2014 | Schell et al. | |
| 8,733,610 | B2 | 5/2014 | Pedicini | |
| 8,763,874 | B2 | 7/2014 | McCardle et al. | |
| 8,777,079 | B2 | 7/2014 | Po et al. | |
| 8,833,626 | B2 | 9/2014 | Perron et al. | |
| 8,833,628 | B2 | 9/2014 | Schwartzenberger | |
| 8,939,341 | B2 | 1/2015 | Pedicini et al. | |
| 9,636,812 | B2 | 5/2017 | Pedicini | |
| 10,549,412 | B2 | 2/2020 | McCardle et al. | |
| 10,625,407 | B2 | 4/2020 | Sato et al. | |
| 10,821,586 | B2 | 11/2020 | Wu et al. | |
| 10,843,317 | B2 | 11/2020 | Sato et al. | |
| 10,898,994 | B2 | 1/2021 | Carrier et al. | |
| 2002/0117531 | A1 | 8/2002 | Schell et al. | |
| 2003/0146262 | A1 | 8/2003 | Hwang et al. | |
| 2005/0082334 | A1 | 4/2005 | Hu | |
| 2006/0043143 | A1 | 3/2006 | Kolodziej et al. | |
| 2006/0043413 | A1 | 3/2006 | Kolodziej et al. | |
| 2006/0124331 | A1 * | 6/2006 | Stirm | F16D 43/208 173/178 |
| 2006/0180631 | A1 * | 8/2006 | Pedicini | B25C 1/06 227/8 |
| 2006/0208027 | A1 | 9/2006 | Hagan | |
| 2007/0251966 | A1 | 11/2007 | Wen | |
| 2007/0251971 | A1 | 11/2007 | Ogawa et al. | |
| 2008/0017689 | A1 | 1/2008 | Simonelli et al. | |
| 2008/0041915 | A1 | 2/2008 | Boyer et al. | |
| 2008/0048000 | A1 | 2/2008 | Simonelli et al. | |
| 2008/0190988 | A1 | 8/2008 | Pedicini | |
| 2008/0210736 | A1 | 9/2008 | Blessing et al. | |
| 2008/0217372 | A1 | 9/2008 | Webb | |
| 2008/0308597 | A1 | 12/2008 | Wojcicki | |
| 2009/0090762 | A1 | 4/2009 | Liembach et al. | |
| 2009/0188766 | A1 * | 7/2009 | Shima | B25C 1/06 173/217 |
| 2009/0236387 | A1 | 9/2009 | Simonelli et al. | |
| 2010/0133313 | A1 | 6/2010 | Nakano et al. | |
| 2010/0243286 | A1 | 9/2010 | Hoshino et al. | |

(56) References Cited

U.S. PATENT DOCUMENTS

| | | | | |
|---|---|---|---|---|
| 2010/0294829 | A1* | 11/2010 | Giordano | A61B 90/98 227/176.1 |
| 2011/0017801 | A1* | 1/2011 | Zemlok | A61B 17/07207 227/175.1 |
| 2011/0198381 | A1* | 8/2011 | McCardle | B25C 1/047 227/8 |
| 2011/0220702 | A1 | 9/2011 | Chen et al. | |
| 2011/0303726 | A1 | 12/2011 | Blessing et al. | |
| 2011/0303729 | A1 | 12/2011 | Hahn et al. | |
| 2012/0187177 | A1 | 7/2012 | Myburgh | |
| 2012/0234643 | A1* | 9/2012 | Moll | B66D 3/20 192/113.22 |
| 2012/0325886 | A1 | 12/2012 | Adachi et al. | |
| 2013/0082082 | A1 | 4/2013 | Tanji | |
| 2013/0175066 | A1 | 7/2013 | Zhang et al. | |
| 2013/0206811 | A1 | 8/2013 | Zhao et al. | |
| 2013/0299546 | A1 | 11/2013 | Zhao et al. | |
| 2013/0320059 | A1 | 12/2013 | Gregory et al. | |
| 2013/0320060 | A1 | 12/2013 | Gregory et al. | |
| 2013/0320063 | A1 | 12/2013 | Gregory et al. | |
| 2013/0320064 | A1 | 12/2013 | Gregory et al. | |
| 2013/0320065 | A1 | 12/2013 | Gregory et al. | |
| 2013/0320066 | A1 | 12/2013 | Gregory et al. | |
| 2013/0320067 | A1 | 12/2013 | Gregory et al. | |
| 2013/0320068 | A1 | 12/2013 | Gregory et al. | |
| 2014/0026409 | A1 | 1/2014 | Liu et al. | |
| 2014/0069671 | A1 | 3/2014 | Leimbach et al. | |
| 2014/0202724 | A1 | 7/2014 | Moore et al. | |
| 2015/0034693 | A1 | 2/2015 | Ronconi et al. | |
| 2015/0047867 | A1* | 2/2015 | Sawano | B25B 23/147 173/217 |
| 2016/0158929 | A1* | 6/2016 | Brennenstuhl | B25B 23/141 173/48 |
| 2016/0288305 | A1 | 10/2016 | McCardle et al. | |
| 2017/0043463 | A1 | 2/2017 | Schnell et al. | |
| 2017/0202605 | A1* | 7/2017 | Shelton, IV | A61B 18/1447 |
| 2017/0326715 | A1 | 11/2017 | Chen et al. | |
| 2018/0126527 | A1 | 5/2018 | Pomeroy et al. | |
| 2018/0126528 | A1 | 5/2018 | Pomeroy et al. | |
| 2018/0178361 | A1* | 6/2018 | Kabbes | B25C 1/008 |
| 2019/0200977 | A1* | 7/2019 | Shelton, IV | A61B 17/068 |
| 2019/0375084 | A1* | 12/2019 | Bierdeman | B25C 1/047 |
| 2020/0070330 | A1 | 3/2020 | Carrier et al. | |
| 2020/0114500 | A1* | 4/2020 | Bierdeman | B25C 1/04 |
| 2020/0130157 | A1* | 4/2020 | Rux | B25C 1/047 |
| 2020/0156228 | A1 | 5/2020 | McCardle et al. | |
| 2020/0164498 | A1 | 5/2020 | Wechselberger et al. | |
| 2021/0169477 | A1* | 6/2021 | Shelton, IV | A61B 17/00234 |
| 2021/0299836 | A1 | 9/2021 | Baba | |
| 2021/0347023 | A1* | 11/2021 | Carrier | B25C 1/06 |
| 2022/0134525 | A1 | 5/2022 | Bandy et al. | |

OTHER PUBLICATIONS

International Search Report and Written Opinion for Application No. PCT/US2016/016847 dated May 26, 2016, 18 pages.

* cited by examiner

GAS SPRING-POWERED FASTENER DRIVER

CROSS-REFERENCE TO RELATED APPLICATIONS

This application is a continuation of co-pending U.S. patent application Ser. No. 16/201,111 filed on Nov. 27, 2018, now U.S. Pat. No. 11,072,058, which is a continuation of U.S. patent application Ser. No. 15/017,291 filed on Feb. 5, 2016, now U.S. Pat. No. 10,173,310, which claims priority to U.S. Provisional Patent Application No. 62/113,050 filed on Feb. 6, 2015; U.S. Provisional Patent Application No. 62/240,801 filed on Oct. 13, 2015; and U.S. Provisional Patent Application No. 62/279,408 filed on Jan. 15, 2016, the entire contents of each of which are incorporated herein by reference.

FIELD OF THE INVENTION

The present invention relates to powered fastener drivers, and more specifically to gas spring-powered fastener drivers.

BACKGROUND OF THE INVENTION

There are various fastener drivers known in the art for driving fasteners (e.g., nails, tacks, staples, etc.) into a workpiece. These fastener drivers operate utilizing various means known in the art (e.g. compressed air generated by an air compressor, electrical energy, a flywheel mechanism, etc.), but often these designs are met with power, size, and cost constraints.

SUMMARY OF THE INVENTION

The present invention provides, in one aspect, a gas spring-powered fastener driver including a cylinder, a moveable piston positioned within the cylinder, a driver blade attached to the piston and movable therewith between a ready position and a driven position, a lifter to move the driver blade from the driven position to the ready position, and a transmission including an output shaft operatively coupled to the lifter to provide torque to the lifter. The fastener driver also includes an input to provide torque to the transmission and a clutch positioned downstream of the input and operably coupled to the output shaft to limit an amount of torque transferred to the output shaft and the lifter. In response to an application of a reaction torque to the output shaft above a predetermined threshold, torque from the input is diverted from the output shaft via the clutch.

The present invention provides, in another aspect, a gas spring-powered fastener driver including a cylinder, a moveable piston positioned within the cylinder, a driver blade attached to the piston and movable therewith between a ready position and a driven position, a lifter to move the driver blade from the driven position to the ready position, and a transmission including an output shaft operatively coupled to the lifter to provide torque to the lifter. The fastener driver also includes an input coupled to the transmission to provide torque to the transmission, a first clutch positioned downstream of the input and configured to transfer torque to the output shaft in a single rotational direction, and a second clutch positioned downstream of the input and operably coupled to the output shaft to limit an amount of torque transferred to the output shaft. In response to an application of a reaction torque to the output shaft above a predetermined threshold, torque from the motor is diverted away from the output shaft via the second clutch.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
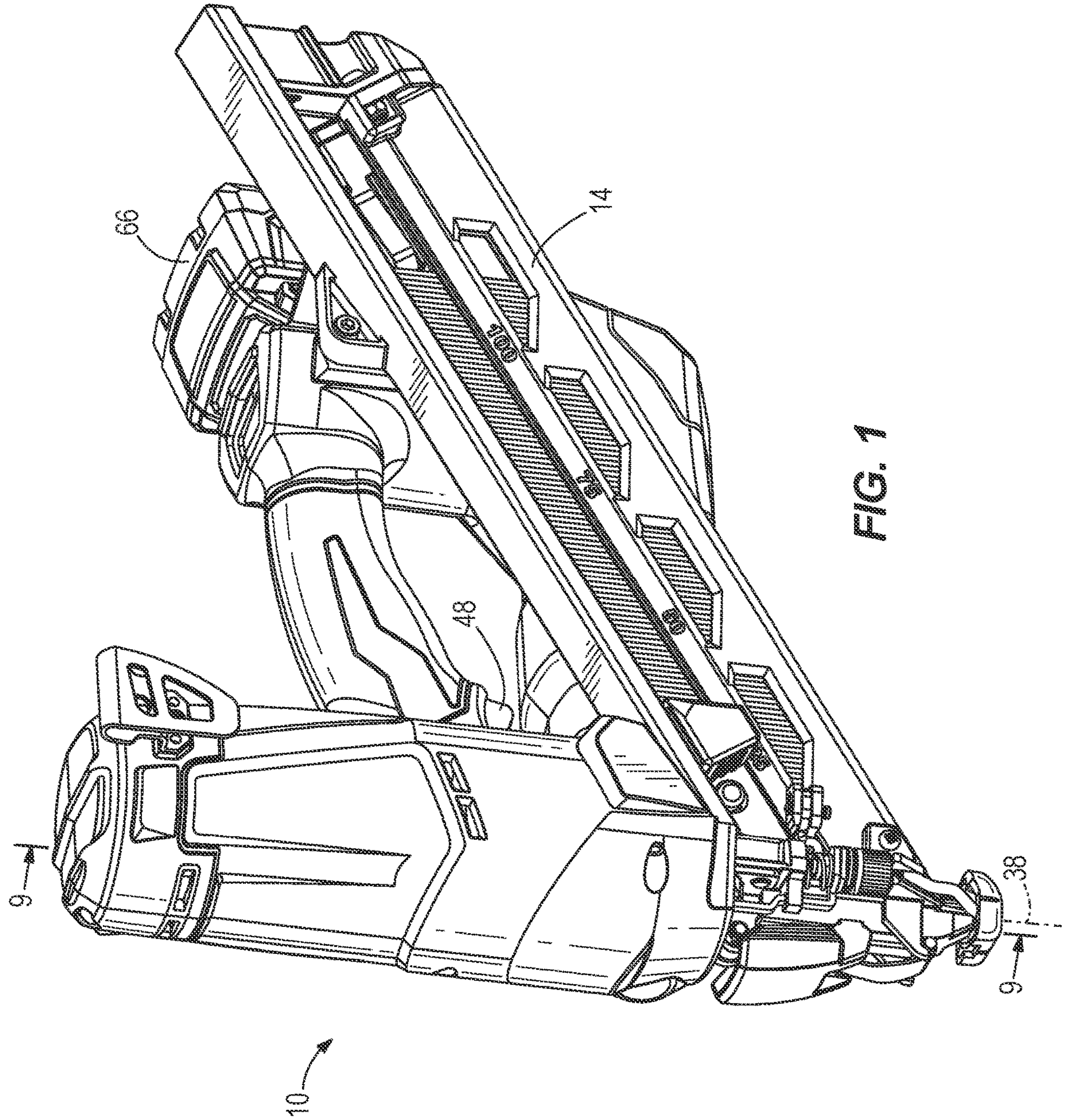
FIG. 1 is perspective view of a gas spring-powered fastener driver in accordance with an embodiment of the invention.
Figure 2:
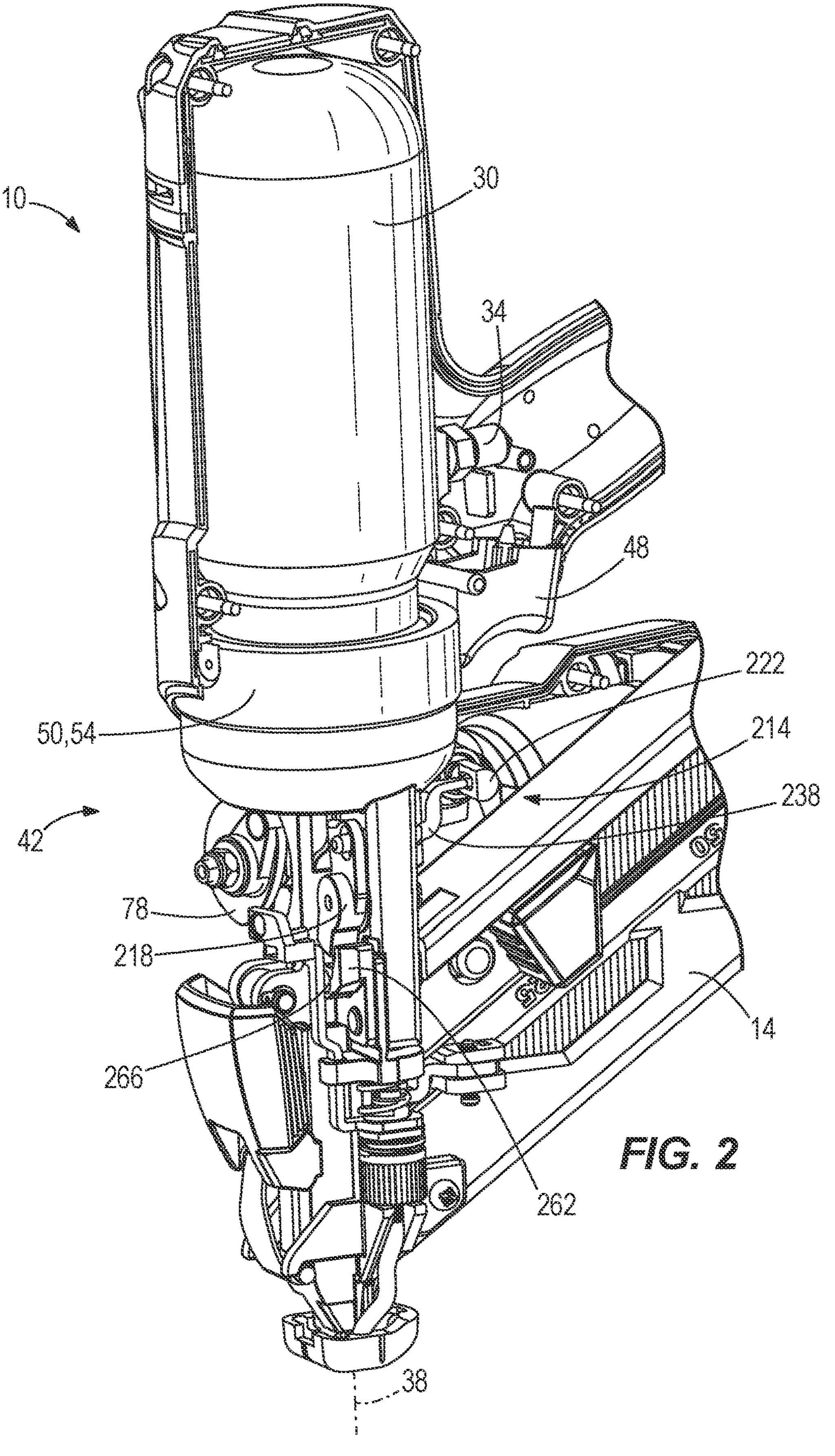
FIG. 2 is a partial cut-away view of the gas spring-powered fastener driver of FIG. 1.
Figure 3:
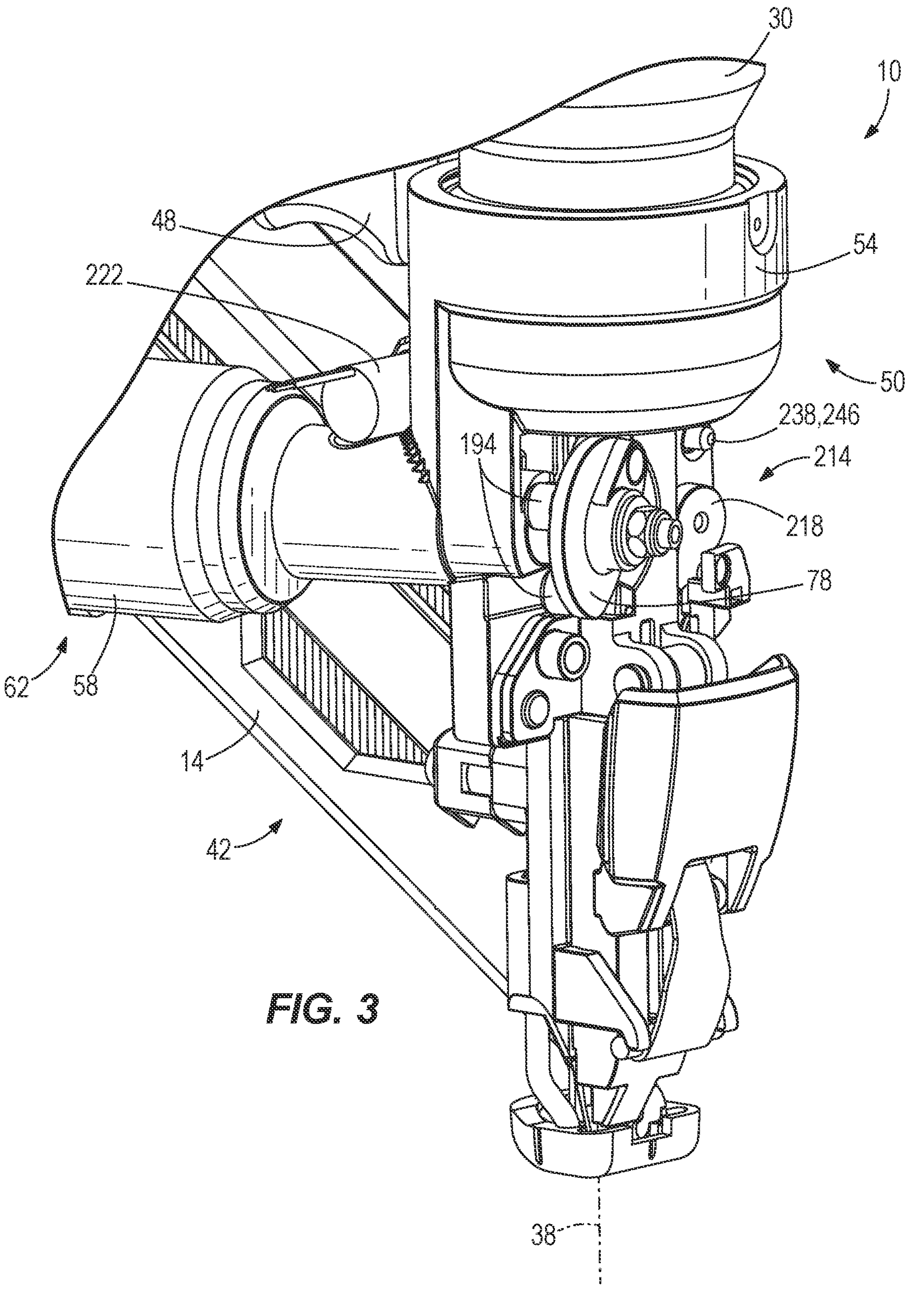
FIG. 3 is another partial cut-away view of the gas spring-powered fastener driver of FIG. 1.
Figure 13:
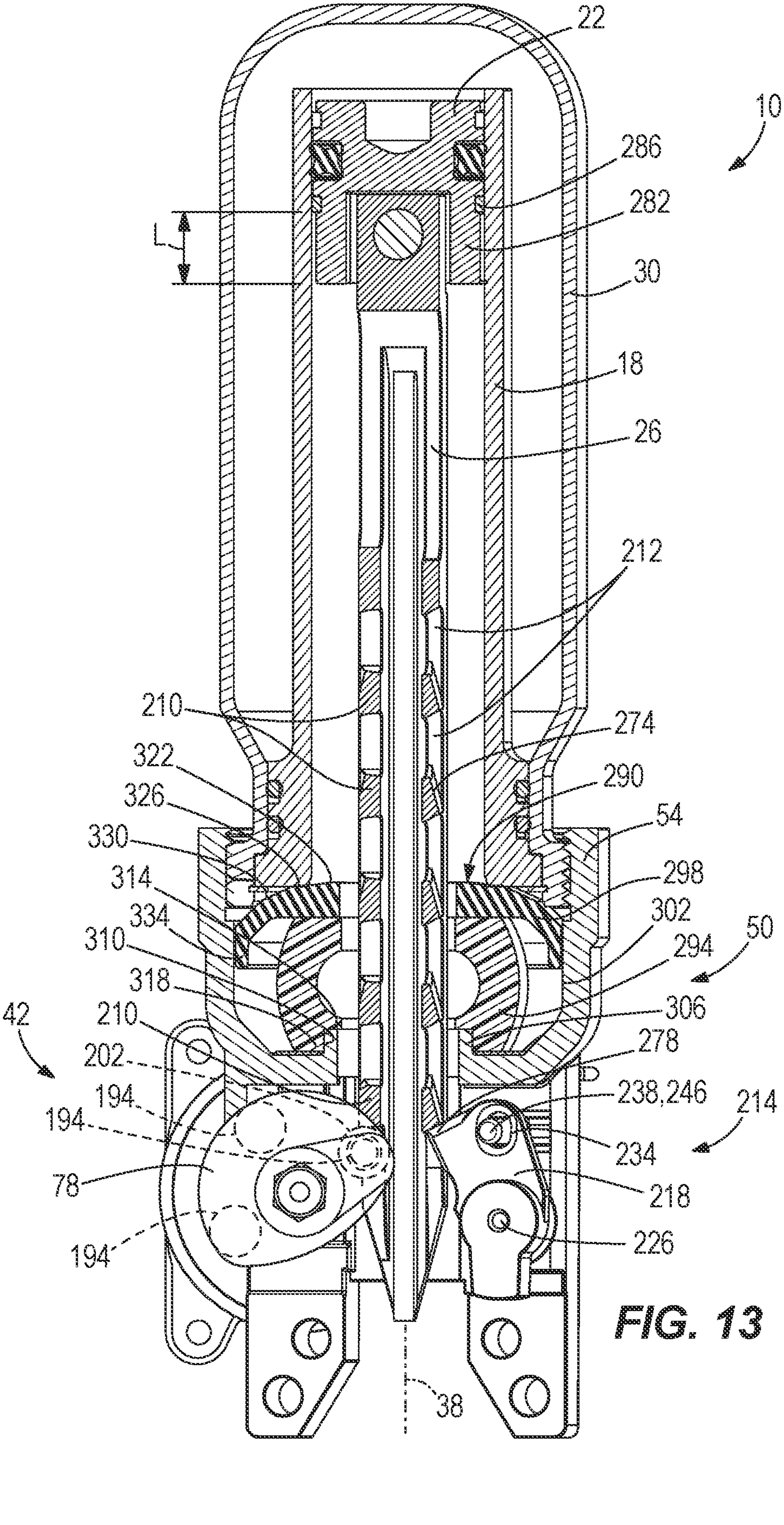
FIG. 13 is a cross-sectional view of the gas spring-powered fastener driver of FIG. 1 taken along the lines 13-13 of FIG. 5, illustrating a driver blade in a ready position.

With reference to FIGS. 1-3, a gas spring-powered fastener driver 10 is operable to drive fasteners (e.g., nails, tacks, staples, etc.) held within a magazine 14 into a workpiece. The fastener driver 10 includes a cylinder 18 and a moveable piston 22 positioned within the cylinder 18 (FIG. 13). With reference to FIG. 13, the fastener driver 10 further includes a driver blade 26 that is attached to the piston 22 and moveable therewith. The fastener driver 10 does not require an external source of air pressure, but rather includes a storage chamber cylinder 30 of pressurized gas in fluid communication with the cylinder 18. In the illustrated embodiment, the cylinder 18 and moveable piston 22 are positioned within the storage chamber cylinder 30. With reference to FIG. 2, the driver 10 further includes a fill valve 34 coupled to the storage chamber cylinder 30. When connected with a source of compressed gas, the fill valve 34 permits the storage chamber cylinder 30 to be refilled with compressed gas if any prior leakage has occurred. The fill valve 34 may be configured as a Schrader valve, for example.

Figure 15:
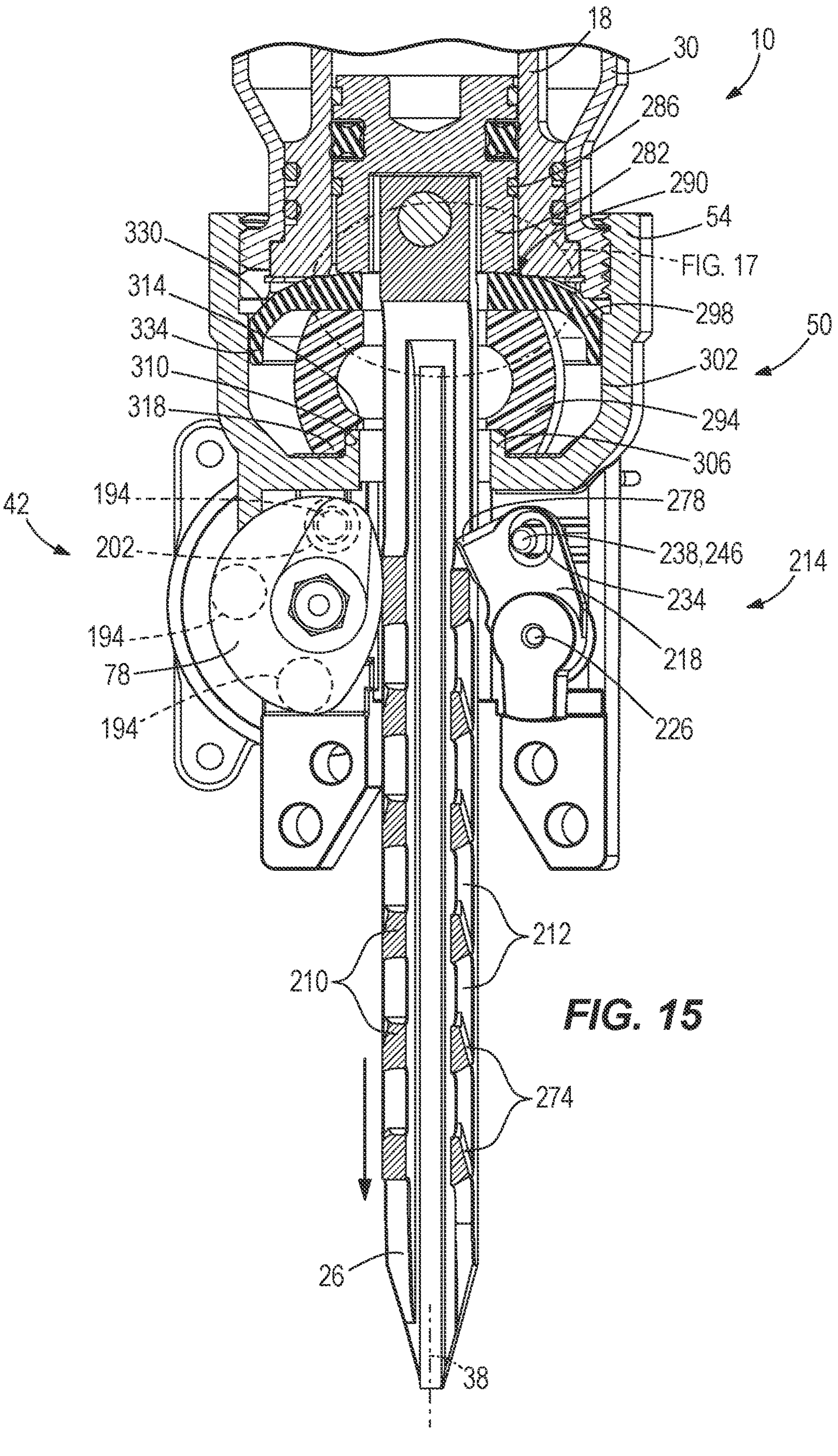
FIG. 15 is a cross-sectional view of the gas spring-powered fastener driver of FIG. 1 taken along the lines 13-13 of FIG. 5, illustrating the driver blade in a driven position.

With reference to FIG. 13, the cylinder 18 and the driver blade 26 define a driving axis 38, and during a driving cycle the driver blade 26 and piston 22 are moveable between a ready position (i.e., top dead center; see FIG. 13) and a driven position (i.e., bottom dead center; see FIG. 15). The fastener driver 10 further includes a lifting assembly 42, which is powered by a motor 46 (FIG. 9), and which is operable to move the driver blade 26 from the driven position to the ready position.

In operation, the lifting assembly 42 drives the piston 22 and the driver blade 26 to the ready position by energizing the motor 46. As the piston 22 and the driver blade 26 are driven to the ready position, the gas above the piston 22 and the gas within the storage chamber cylinder 30 is compressed. Once in the ready position, the piston 22 and the driver blade 26 are held in position until released by user activation of a trigger 48. When released, the compressed gas above the piston 22 and within the storage chamber 30 drives the piston 22 and the driver blade 26 to the driven position, thereby driving a fastener into a workpiece. The illustrated fastener driver 10 therefore operates on a gas spring principle utilizing the lifting assembly 42 and the piston 22 to further compress the gas within the cylinder 18 and the storage chamber cylinder 30. Further detail regarding the structure and operation of the fastener driver 10 is provided below.

Figure 9:
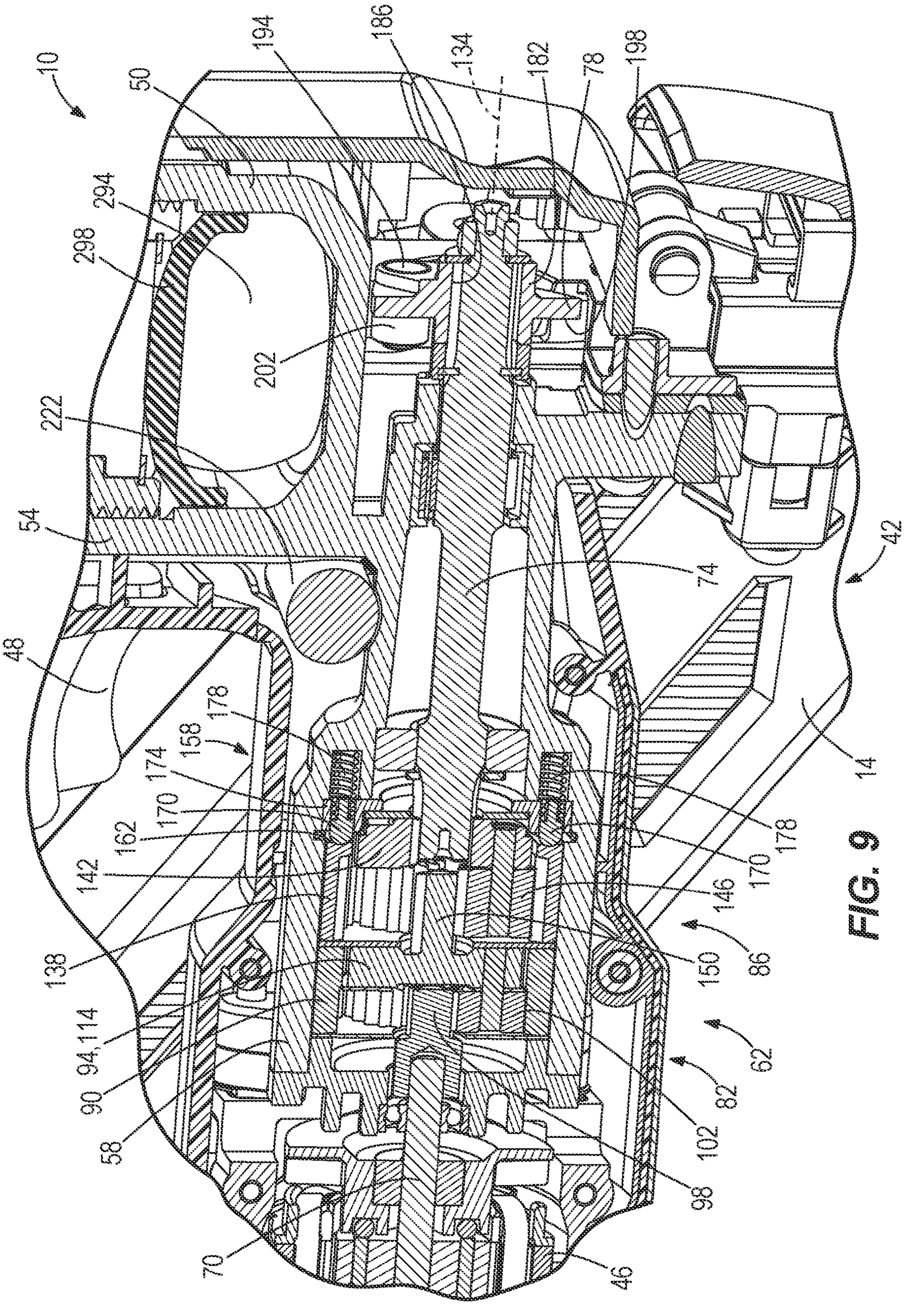
FIG. 9 is a cross-sectional view of the gas spring-powered fastener driver of FIG. 1 taken along lines 9-9 shown in FIG. 1, illustrating a transmission, the lifter, and a transmission output shaft interconnecting the transmission and the lifter.

With reference to FIGS. 2 and 3, the driver 10 includes a housing 50 having a cylinder support portion 54 in which the storage chamber cylinder 30 is at least partially positioned and a transmission housing portion 58 in which a transmission 62 is at least partially positioned. In the illustrated embodiment, the cylinder support portion 54 is integrally formed with the transmission housing portion 58 as a single piece (e.g., using a casting or molding process, depending on the material used). As described below in further detail, the transmission 62 is a component of the lifting assembly 42, which raises the driver blade 26 from a driven position to a ready position. With reference to FIG. 9, the motor 46 is also a component of the lifting assembly 42 and is coupled to the transmission housing portion 58 for providing torque to the transmission 62 when activated. A battery 66 (FIG. 1) is electrically connectable to the motor 46 for supplying electrical power to the motor 46. In alternative embodiments, the driver may be powered from an AC voltage input (i.e., from a wall outlet), or by an alternative DC voltage input (e.g., a DC power support).

With reference to FIG. 9, the transmission 62 includes an input 70 (i.e., a motor output shaft) and includes an output shaft 74 extending to a lifter 78, which is operable to move the driver blade 26 from the driven position to the ready position, as explained in greater detail below. In other words, the transmission 62 provides torque to the lifter 78 from the motor 46. The transmission 62 is configured as a planetary transmission having first and second planetary stages 82, 86. In alternative embodiments, the transmission may be a single-stage planetary transmission, or a multi-stage planetary transmission including any number of planetary stages.

Figure 11:
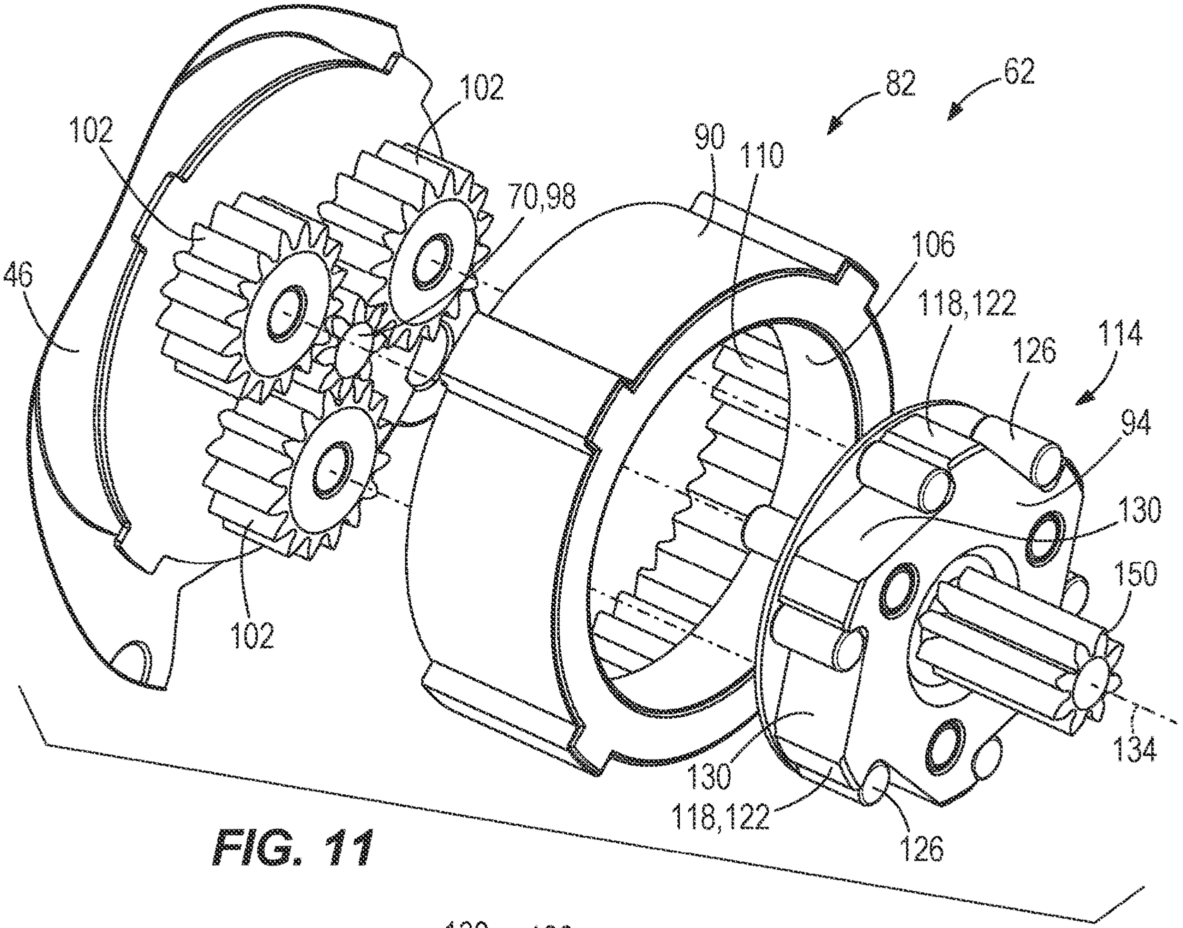
FIG. 11 is an exploded view of a first stage of the transmission of FIG. 9, illustrating the one-way clutch mechanism.

With reference to FIGS. 9 and 11, the first planetary stage 86 includes a ring gear 90, a carrier 94, a sun gear 98, and multiple planet gears 102 coupled to the carrier 94 for relative rotation therewith. The sun gear 98 is drivingly coupled to the motor output shaft 70 and is enmeshed with the planet gears 102. The ring gear 90 includes a cylindrical interior peripheral portion 106 and a toothed interior peripheral portion 110 adjacent the cylindrical interior peripheral portion 106. In the illustrated embodiment, the ring gear 90 in the first planetary stage 82 is fixed to the transmission housing portion 58 such that it is prevented from rotating relative to the transmission housing portion 58. The plurality of planet gears 102 are rotatably supported upon the carrier 94 and are engageable with (i.e., enmeshed with) the toothed interior peripheral portion 110.

Figure 10:
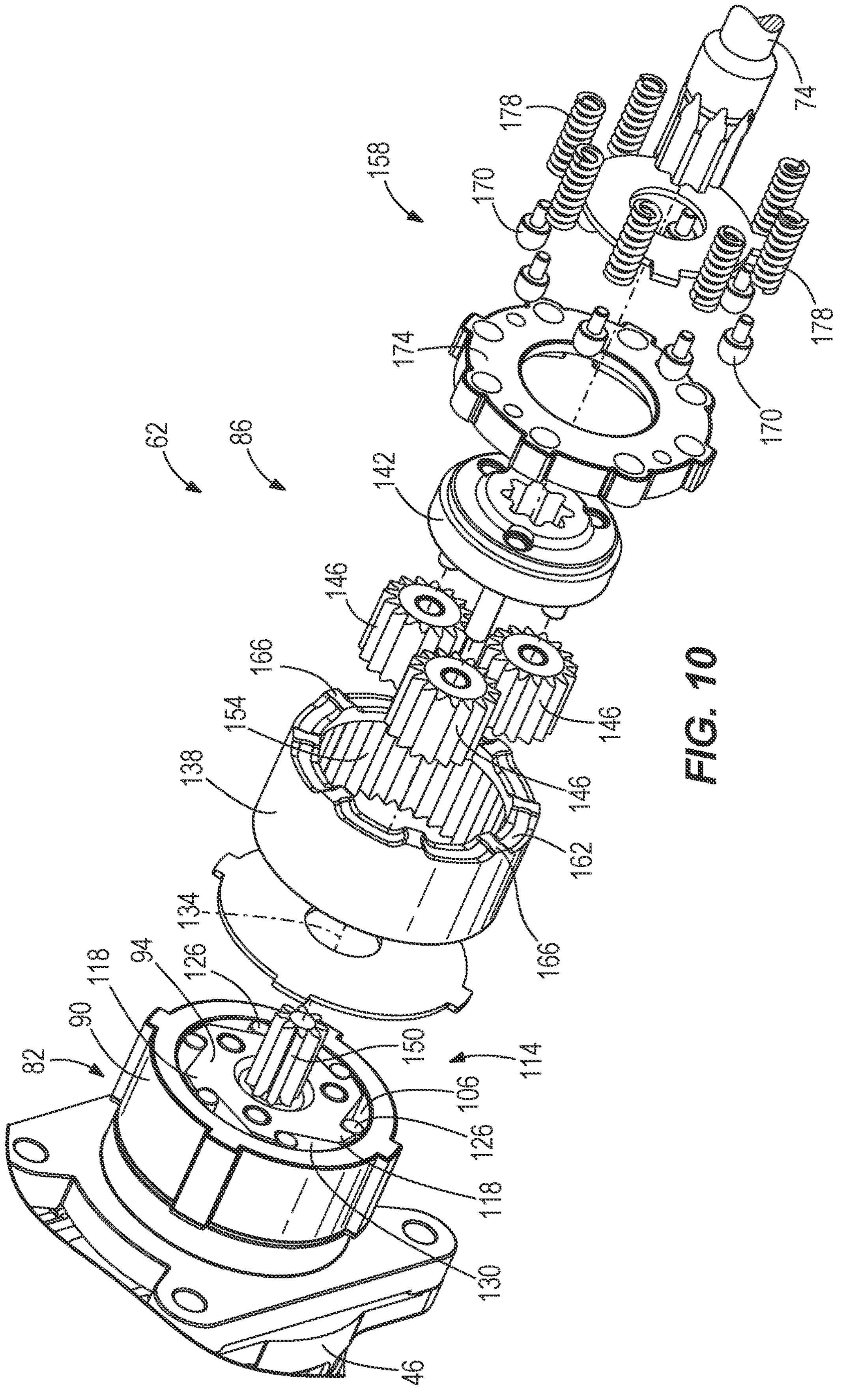
FIG. 10 is an exploded view of a secondary stage the transmission of FIG. 9, illustrating a one-way clutch mechanism and a torque-limiting clutch mechanism.
Figure 12:
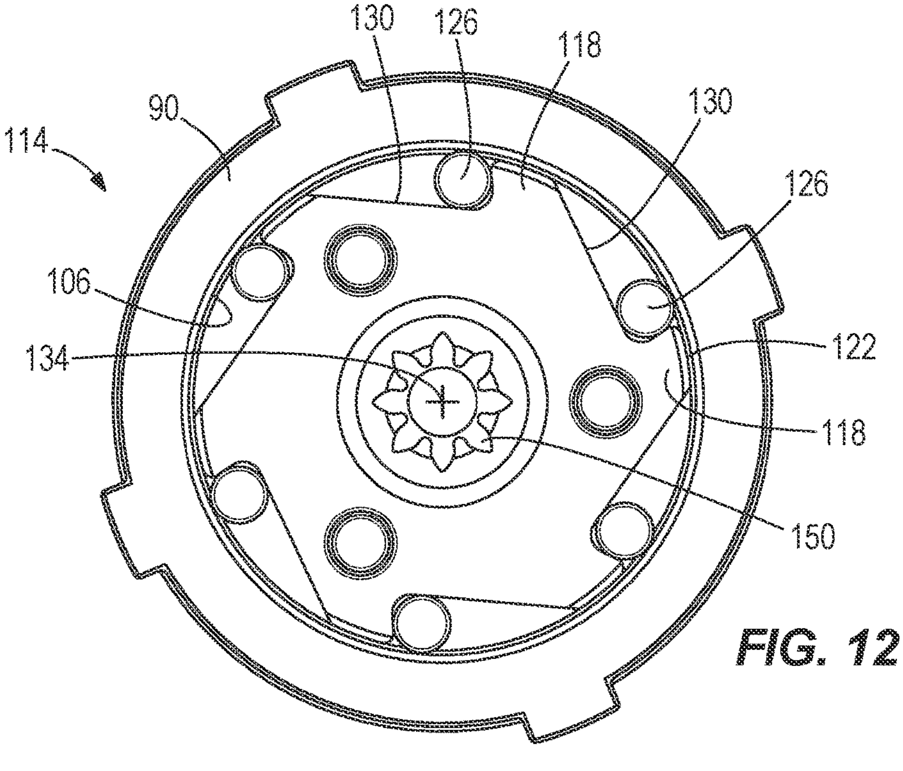
FIG. 12 is an end view of the first stage of the transmission of FIG. 9, illustrating the one-way clutch mechanism.

With reference to FIGS. 10-12, the driver 10 further includes a one-way clutch mechanism 114 incorporated in the transmission 62. More specifically, the one-way clutch mechanism 114 includes the carrier 94, which is also a component in the first planetary stage 82. The one-way clutch mechanism 114 permits a transfer of torque to the output shaft 74 of the transmission 62 in a single (i.e., first) rotational direction (i.e., counter-clockwise from the frame of reference of FIGS. 10 and 12), yet prevents the motor 46 from being driven in a reverse direction in response to an application of torque on the output shaft 74 of the transmission 62 in an opposite, second rotational direction (e.g., clockwise from the frame of reference of FIGS. 10 and 12). In the illustrated embodiment, the one-way clutch mechanism 114 is incorporated with the first planetary stage 82 of the transmission 62. In alternative embodiments, the one-way clutch mechanism 114 may be incorporated into the second planetary stage 86, for example.

With continued references to FIGS. 10 and 11, the one-way clutch mechanism 114 also includes a plurality of lugs 118 defined on an outer periphery 122 of the carrier 94. In addition, the one-way clutch mechanism 114 includes a plurality of rolling elements 126 engageable with the respective lugs 118, and a ramp 130 adjacent each of the lugs 118 along which the rolling element 126 is moveable. Each of the ramps 130 is inclined in a manner to displace the rolling elements 126 farther from a rotational axis 134 (FIG. 11) of the carrier 94 as the rolling elements 126 move further from the respective lugs 118. With reference to FIG. 11, the carrier 94 of the one-way clutch mechanism 114 is in the same planetary stage of the transmission 62 as the ring gear 90 (i.e., the first planetary stage 82). The rolling elements 126 are engageable with the cylindrical interior peripheral portion 106 of the ring gear 90 in response to an application or torque on the transmission output shaft 74 in the second rotational direction (i.e., as the rolling elements 126 move along the ramps 130 away from the respective lugs 118).

In operation of the one-way clutch mechanism 114, the rolling elements 126 are maintained in engagement with the respective lugs 118 in the first rotational direction (i.e., counter-clockwise from the frame of reference of FIGS. 10 and 12) of the transmission output shaft 74. However, the rolling elements 126 move away from the respective lugs 118 in response to an application of torque on the transmission output shaft 74 in an opposite, second rotational direction (i.e., clockwise from the frame of reference of FIGS. 10 and 12). More specifically, when the transmission output shaft 74 rotates a small amount (e.g., 1 degree) in the second rotational direction, the rolling elements 126 roll away from the respective lugs 118, along the ramps 130, and engage the cylindrical interior peripheral portion 106 on the ring gear 90 to thereby prevent further rotation of the transmission output shaft 74 in the second rotational direction. In other words, the one-way clutch mechanism 114 prevents the transmission 62 from applying torque to the motor 46, which might otherwise back-drive or cause the motor 46 to rotate in a reverse direction, in response to an application of torque on the transmission output shaft 74 in an opposite, second rotational direction. The one-way clutch mechanism 114 also prevents the motor 46 from being back-driven by the transmission 62 when the driver blade 26 is being held in the ready position, as explained further below.

With reference to FIGS. 9 and 10, the second planetary stage 86 includes a ring gear 138, a carrier 142, and multiple planet gears 146 coupled to the carrier 142 for relative rotation therewith. The carrier 94, which is part of the one-way clutch mechanism 114, further includes an output pinion 150 that is enmeshed with the planet gears 146 which, in turn, are rotatably supported upon the carrier 142 of the second planetary stage 86 and enmeshed with a toothed interior peripheral portion 154 of the ring gear 138. Unlike the ring gear 90 of the first planetary stage 82, the ring gear 138 of the second planetary stage 86 is selectively rotatable relative to the transmission housing portion 58.

The driver 10 further includes a torque-limiting clutch mechanism 158 incorporated in the transmission 62. More specifically, the torque-limiting clutch mechanism 158 includes the ring gear 138, which is also a component of the second planetary stage 86. The torque-limiting clutch mechanism 158 limits an amount of torque transferred to the transmission output shaft 74 and the lifter 78. In the illustrated embodiment, the torque-limiting clutch mechanism 158 is incorporated with the second planetary stage 86 of the transmission 62 (i.e., the last of the planetary transmission stages), and the one-way and torque-limiting clutch mechanisms 114, 158 are coaxial (i.e., aligned with the rotational axis 134).

With continued references to FIGS. 9 and 10, the ring gear 138 of the torque-limiting clutch mechanism 158 includes an annular front end 162 having a plurality of lugs 166 defined thereon. The torque-limiting clutch mechanism 158 further includes a plurality of detent members 170 supported within a collar 174 fixed to the transmission housing portion 58. The detent members 170 are engageable with the respective lugs 166 to inhibit rotation of the ring gear 138, and the torque-limiting clutch mechanism 158 further includes a plurality of springs 178 for biasing the detent members 170 toward the annular front end 162 of the ring gear 138. In response to a reaction torque applied to the transmission output shaft 74 that is above a predetermined threshold, torque from the motor 46 is diverted from the transmission output shaft 74 to the ring gear 138, causing the ring gear 138 to rotate and the detent members 170 to slide over the lugs 166. As described in further detail below, when the driver blade 26 is being held in the ready position, the reaction torque applied to the transmission 62 through the output shaft 74 is insufficient to cause the torque-limiting clutch mechanism 158 to slip in this manner.

Figure 4:
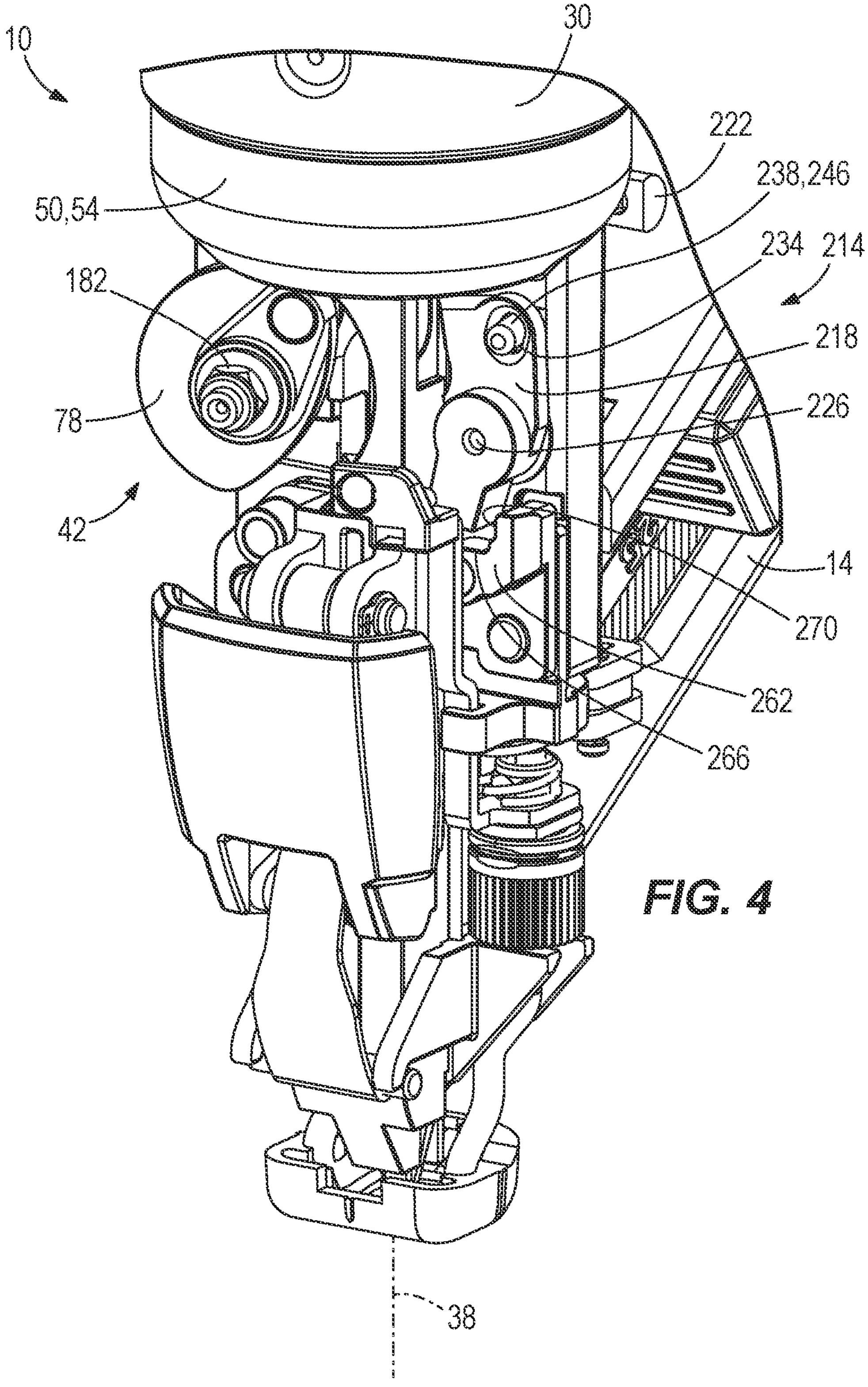
FIG. 4 is an enlarged partial front view of the gas spring-powered fastener driver of FIG. 1, with portions removed for clarity.
Figure 5:
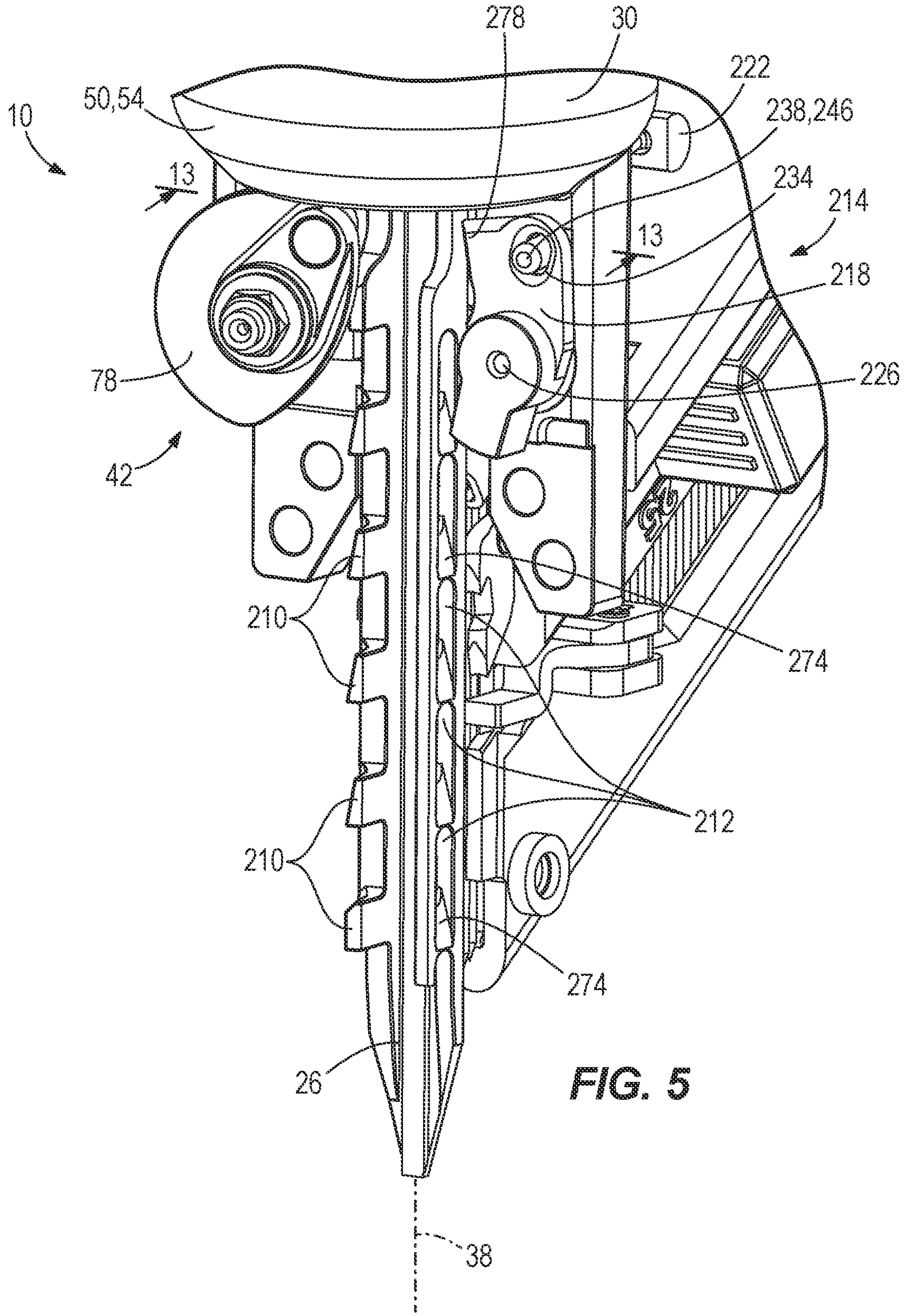
FIG. 5 is an enlarged partial front view of the gas spring-powered fastener driver of FIG. 1, with portions removed for clarity.
Figure 6:
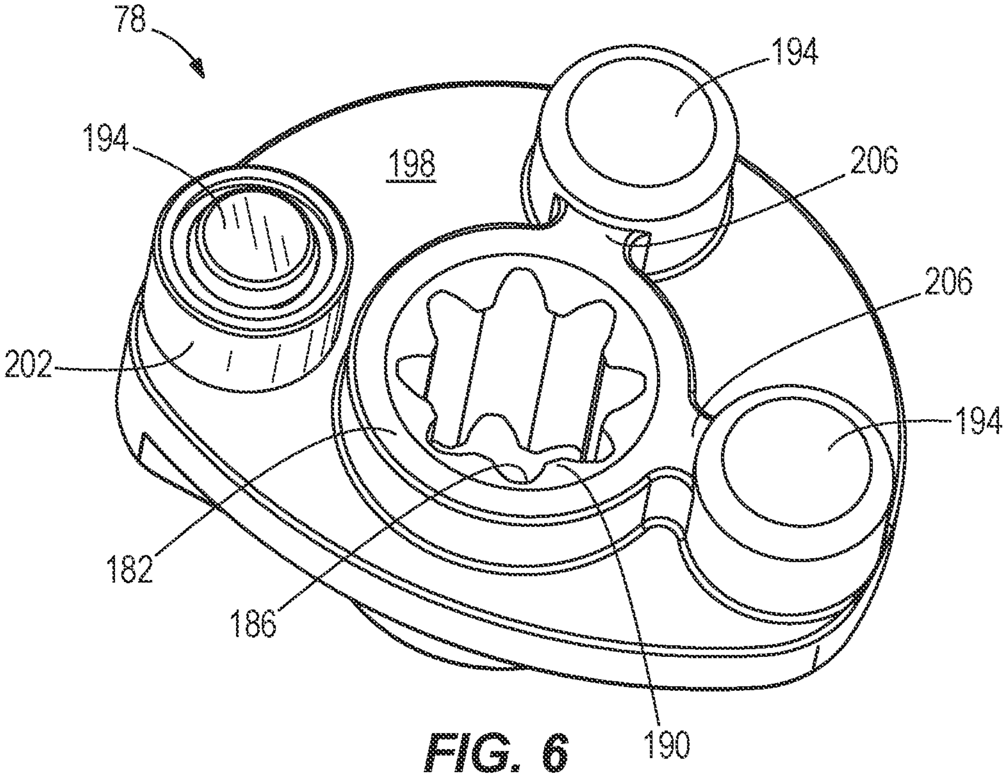
FIG. 6 is a perspective view of a lifter for the gas spring-powered fastener driver of FIG. 1.

With reference to FIGS. 4-6 and 9, the lifter 78, which is a component of the lifting assembly 42, is coupled for co-rotation with the transmission output shaft 74 which, in turn, is coupled for co-rotation with the second-stage carrier 142 by a spline-fit arrangement (FIG. 10). The lifter 78 includes a hub 182 having a bore 186 defined by a plurality of axially extending splines 190 (FIG. 6). The transmission output shaft 74 includes corresponding splines formed on an outer periphery thereof that engage the splines 190 in the bore 186 of the lifter hub 182. One or more alignment features may be formed on the transmission output shaft 74 and/or the lifter 78 to limit assembly of the lifter 78 onto the transmission output shaft 74 in a single orientation. With continued reference to FIG. 6, the lifter 78 includes three pins 194 extending from a rear face 198 thereof arranged asymmetrically about the hub 182. The pins 194 are sequentially engageable with the driver blade 26 to raise the driver blade 26 from the driven position (FIG. 15) to the ready position (FIG. 13). In the illustrated embodiment, a bearing 202 (FIG. 6) is positioned over one of the pins 194 to facilitate disengagement from the driver blade 26 during initiation of a firing cycle, as described in more detail below. The lifter 78 also includes a plurality of webs 206 interconnecting the hub 182 with one or more of the pins 194, thereby structurally reinforcing the pins 194.

With reference to FIG. 5, the driver blade 26 includes teeth 210 along the length thereof, and the pins 194 and/or the respective bearing 202 are engageable with the teeth 210 when returning the driver blade 26 from the driven position to the ready position. Because the bearing 202 is capable of rotating relative to the respective pins 194, sliding movement between the bearing 202 and the teeth 210 is inhibited when the lifter 78 is moving the driver blade 26 from the driven position to the ready position. As a result, friction and attendant wear on the teeth 210 that might otherwise result from sliding movement between the pins 194 and the teeth 210 is reduced. The driver blade 26 further includes axially spaced apertures 212, the purpose of which is described below, formed on a side opposite the teeth 210.

Figure 6A:
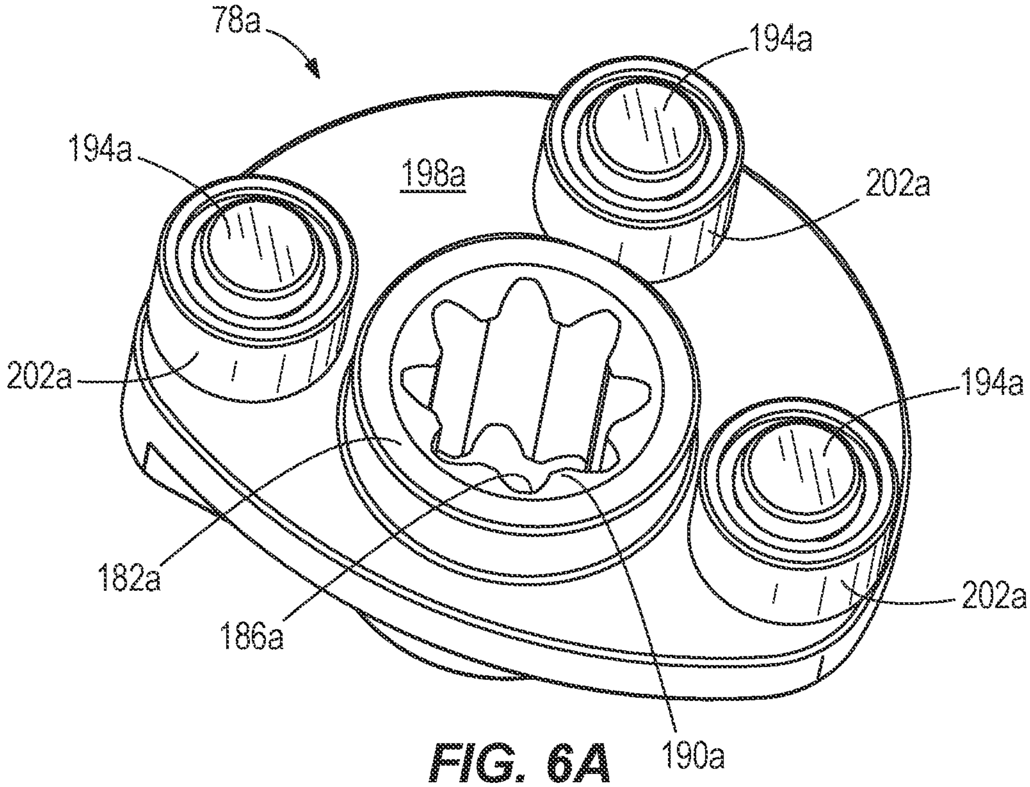
FIG. 6A is a perspective view of a lifter for the gas spring-powered fastener driver in accordance with another embodiment of the invention.

With reference to FIG. 6A, an alternative lifter **78*a* according to an alternative embodiment of the invention is illustrated. The lifter 78*a* is similar to the lifter 78 and, in some embodiments of the invention, intended to replace the lifter 78 in the lifting assembly 42. The lifter 78*a* includes a hub 182*a* having a bore 186*a* defined by a plurality of axially extending splines 190*a*. The transmission output shaft 74 includes corresponding splines formed on an outer periphery thereof that engage the splines 190*a* in the bore 186*a* of the lifter hub 182*a*. The lifter 78*a* also includes three pins 194*a* extending from a rear face 198*a* thereof arranged asymmetrically about the hub 182*a*. A bearing 202*a* is positioned over each of the pins 194*a* to facilitate disengagement from the driver blade 26. As explained above, because each of the bearings 202*a* is rotatable relative to the pin 194*a* upon which it is supported, subsequent wear to each of the pins 194*a* and the corresponding teeth 210** is reduced.

Figure 7:
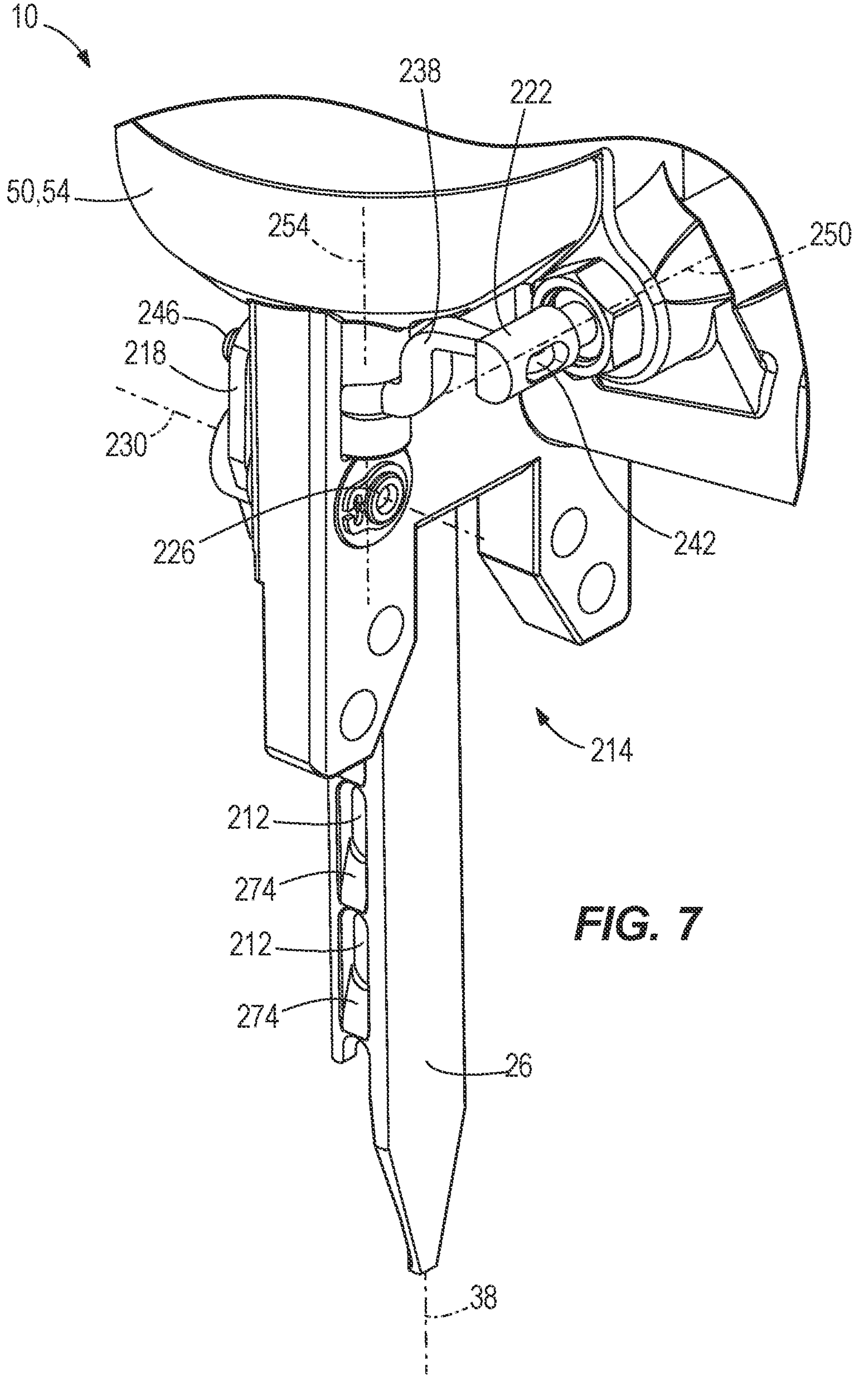
FIG. 7 is a rear perspective view of a latching assembly for the gas spring-powered fastener driver of FIG. 1.

With reference to FIGS. 5 and 7, the driver 10 further includes a latch assembly 214 having a pawl or latch 218 for selectively holding the driver blade 26 in the ready position, and a solenoid 222 for releasing the latch 218 from the driver blade 26. In other words, the latching assembly 214 is moveable between a latched state (FIGS. 8B and 13) in which the driver blade 26 is held in a ready position against a biasing force (i.e., the pressurized gas in the storage chamber 30), and a released state (FIGS. 8A and 14) in which the driver blade 26 is permitted to be driven by the biasing force from the ready position to a driven position. In particular, the latch 218 includes an integral shaft 226 (FIGS. 8A and 8B) that is rotatably supported by the housing 50 about a latch axis 230 and an elongated slot 234 formed therein.

Figure 8B:
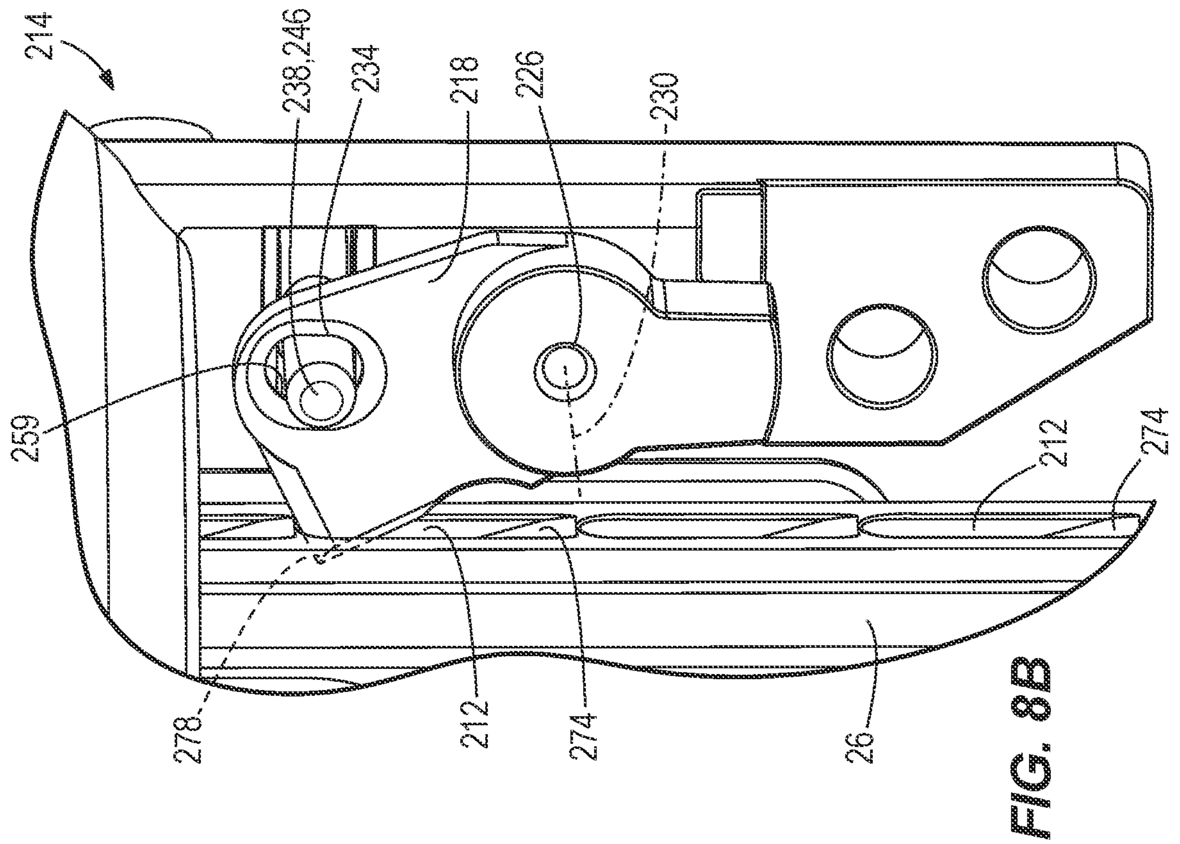
FIG. 8B is an enlarged partial front view of the latching assembly of FIG. 7, showing the latch of the latching assembly in a latched state.
Figure 8A:
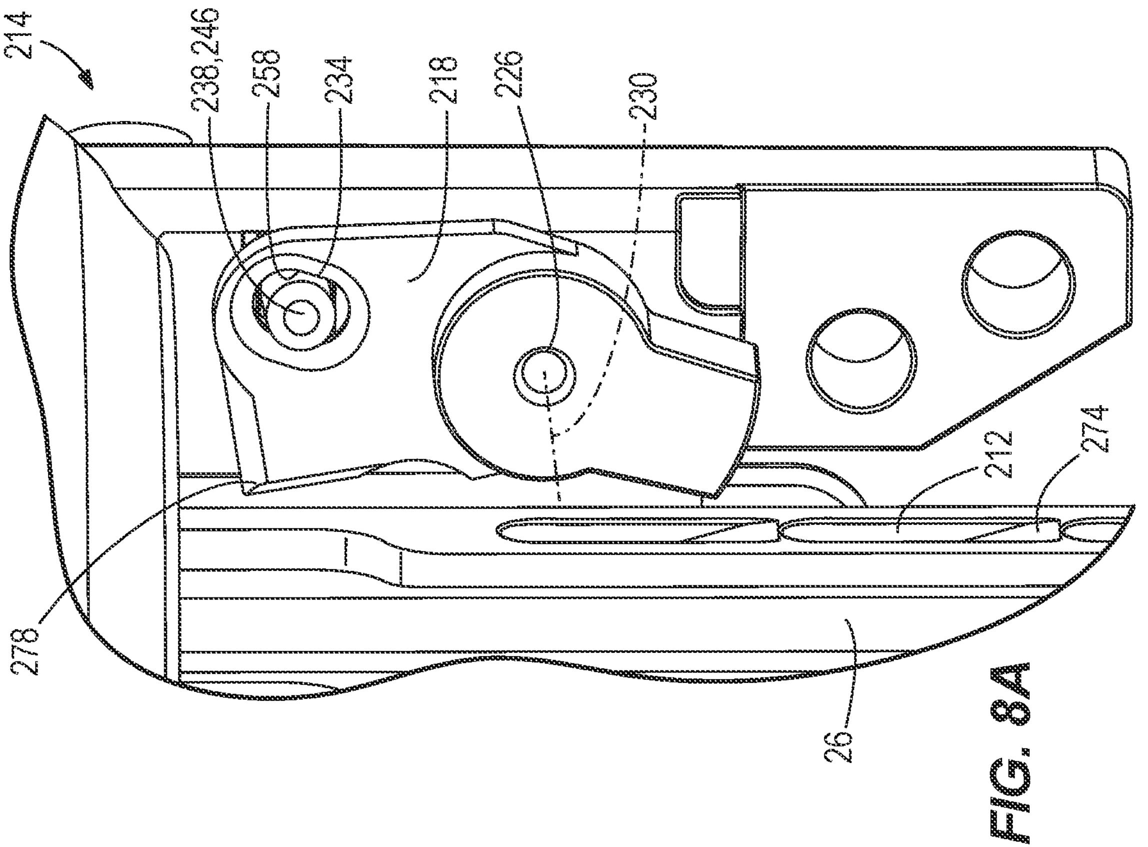
FIG. 8A is an enlarged partial front view of the latching assembly of FIG. 7, showing a latch of the latching assembly in a released state.

With reference to FIG. 7, the latching assembly 214 also includes a linkage 238 pivotably supported by the housing 50 for moving the latch 218 out of engagement with the driver blade 26 when transitioning from the latched state (FIG. 8B) to the released state (FIG. 8A). The linkage 238 includes a first end 242 (FIG. 7) pivotably coupled to the solenoid 222 and a second end 246 positioned within the slot 234 in the latch 218 (FIGS. 8A and 8B). Movement of the second end 246 of the linkage 238 within the slot 234 causes the latch 218 to rotate. When the solenoid 222 is energized, a plunger of the solenoid 222 retracts along a solenoid axis 250 (FIG. 7), causing the linkage 238 to pivot relative to the housing 50 about a linkage axis 254. As the linkage 238 pivots, the second end 246 of the linkage 238 moves within the slot 234 in the latch 218 and bears against an interior wall 258 of the latch 218 that defines the slot 234. Continued movement of the second end 246 of the linkage 238 within the slot 234 causes the latch 218 to rotate about the latch axis 230 in a clockwise direction from the frame of reference of FIG. 8A, thereby disengaging the latch 218 from the driver blade 26 (FIG. 8A). In other words, the latch 218 is removed from one of the axially spaced apertures 212 in the driver blade 26, concluding the transition to the released state. When the solenoid 222 is de-energized, an internal spring bias within the solenoid 222 causes the plunger of the solenoid 222 to extend along the solenoid axis 250, causing the linkage 238 to pivot in an opposite direction about the linkage axis 254. As the linkage 238 pivots, the second end 246 of the linkage 238 moves within the slot 234 in the latch 218 and bears against an opposite interior wall 259 of the latch 218 that defines the slot 234. Continued movement of the second end 246 of the linkage 238 within the slot 234 causes the latch 218 to re-engage the driver blade 26 and/or be reinserted within one of the apertures 212 in the driver blade 26, concluding the transition to the latched state shown in FIG. 8B. In alternative embodiments, one or more springs may be used to separately bias the linkage 238 and/or the latch 218 to assist the internal spring bias within the solenoid 22 in returning the latch assembly to the latched state.

In other words, the latch 218 is moveable between a latched position (coinciding with the latched state of the latching assembly 214 shown in FIG. 8B) in which the latch 218 is received in one of the openings 212 in the driver blade 26 for holding the driver blade 26 in the ready position against the biasing force of the compressed gas, and a released position (coinciding with the released state of the latching assembly 214 shown in FIG. 8A) in which the driver blade 26 is permitted to be driven by the biasing force of the compressed gas from the ready position to the driven position. With reference to FIG. 4, the driver 10 includes a nosepiece 262 having a notch 266 into which a portion of the latch 218 is received. The notch 266 is at least partially defined by a stop surface 270 against which the latch 218 is engageable when the solenoid 222 is de-energized to limit the extent to which the latch 218 is rotatable in a counter-clockwise direction from the frame of reference of FIG. 4 about the latch axis 230 upon return to the latched state.

Figure 16:
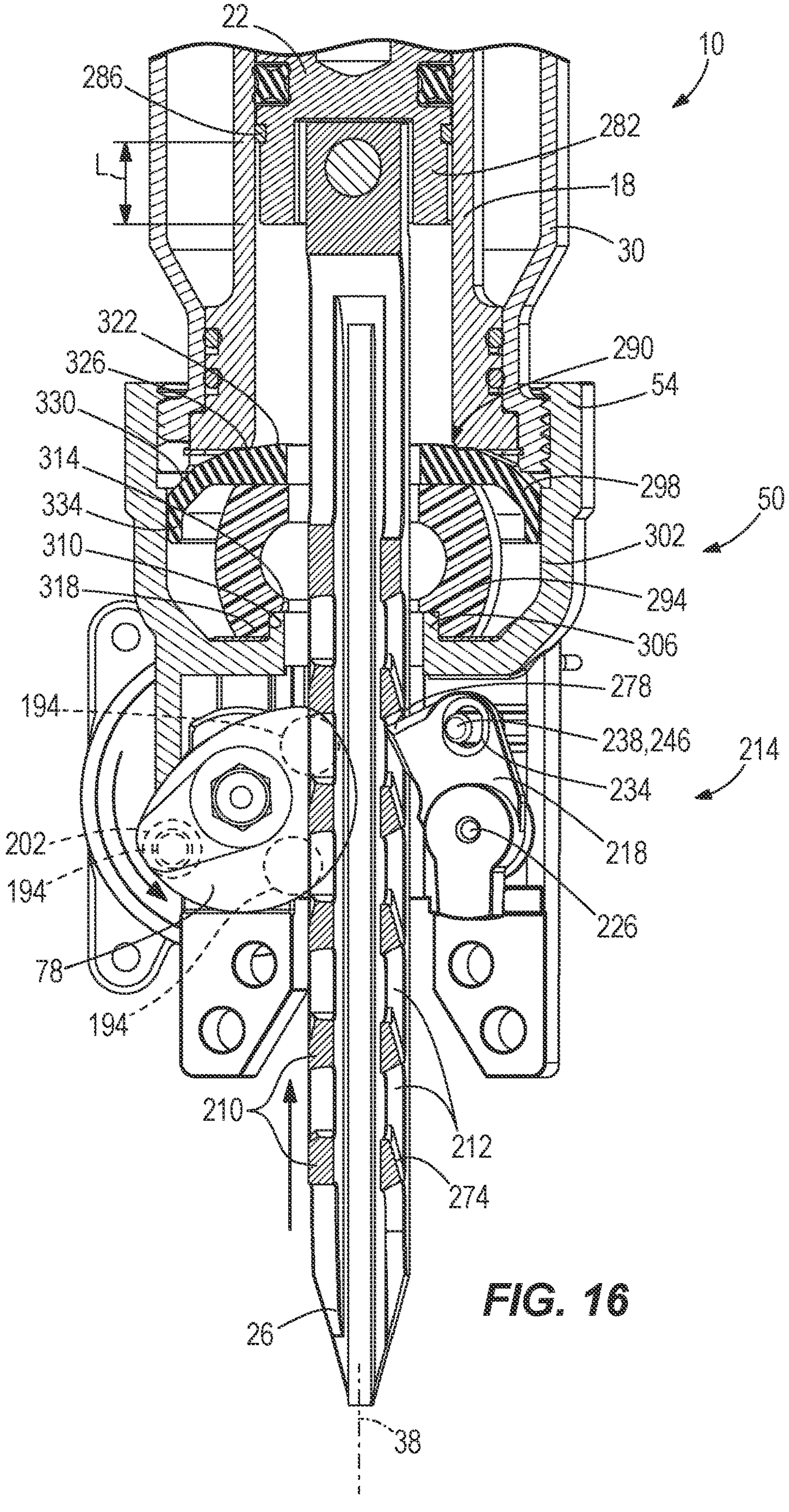
FIG. 16 is a cross-sectional view of the gas spring-powered fastener driver of FIG. 1 taken along the lines 13-13 of FIG. 5, illustrating the lifter moving the driver blade toward the ready position.

With reference to FIGS. 5 and 16, the apertures 212 are positioned along the length of the driver blade 26, and driver blade 26 further includes a ramp 274 adjacent each of the apertures 212 to facilitate entry of the latch 218 into each of the apertures 212. The axially spaced ramps 274 are positioned between adjacent apertures 212, with the ramps 274 being inclined in a laterally outward direction from top to bottom of the driver blade 26. In other words, each of the apertures 212 includes an adjacent ramp 274 beneath it, with the ramp 274 extending between the laterally inward end of the aperture 212 and the laterally outward end of the aperture 212. In the illustrated embodiment, the latch 218 further includes a pointed end 278 that is receivable in any of the apertures 212. During a firing cycle, the driver blade 26 may seize or become stalled as a result of a jam caused by the fastener being driven into a workpiece. During such a jam, the driver blade 26 may become stopped at a location where none of the pins 194 of the lifter 78 is capable of re-engaging one of the teeth 210 to return the driver blade 26 to the top dead center position. In this situation, the ramps 274 guide the pointed end 278 of the latch 218 toward the closest aperture 212 above the latch 218 to ensure that the pointed end 278 will catch within the aperture 212 once the jam is cleared and the driver blade 26 resumes the interrupted firing cycle (i.e., moving toward the bottom dead center position). Once the latch 218 catches the driver blade 28, the teeth 210 are repositioned in the proper location to allow the pins 194 of the lifter 78 to re-engage the teeth 210 and return the driver blade 26 to the top dead center position. Therefore, the driver blade 26 is reliably prevented from completing the driving cycle that was interrupted by the jam, and is rather returned to the top dead center position immediately following the jam being cleared.

With reference to FIG. 13, the piston 22 includes a skirt 282 having a length dimension "L" beneath a lowermost wear ring 286 sufficient to prevent the wear ring 286 from exiting a bottom opening 290 of the cylinder 18 while the piston 22 is at the bottom dead center position coinciding with the driven position of the driver blade 26. The driver 10 also includes a bumper 294 positioned beneath the piston 22 for stopping the piston 22 at the driven position (FIG. 15) and absorbing the impact energy from the piston 22, and a conical washer 298 (i.e., a washer having at least a partially tapered outer diameter) positioned between the piston 22 and the bumper 294 that distributes the impact force of the piston 22 uniformly throughout the bumper 294 as the piston 22 is rapidly decelerated upon reaching the driven position (i.e., bottom dead center).

With reference to FIG. 13, the bumper 294 is received within a recess 302 formed in the housing 50 and positioned below the cylinder support portion 54. A cylindrical boss 306 formed in the bottom of the recess 302 is received within a cutout 310 formed in the bumper 294. In particular, the cutout 310 includes a portion 314 positioned above the cylindrical boss 306 and a portion 318 radially outward from the cylindrical boss 306. The cutout 310 coaxially aligns the bumper 294 with respect to the driver blade 26. In alternative embodiments, the cylindrical boss 306 and the cutout 310 may be supplemented with additional structure for inhibiting relative rotation between the bumper 294 and the recess 302 (e.g., a key and keyway arrangement).

The conical washer 298 extends above and at least partially around the bumper 294. Specifically, the conical washer 298 includes a dome portion 322 against which the piston 22 impacts, an upper flat annular portion 326 surrounding the dome portion 322, a tapering portion 330 with a progressively increasing outer diameter (from top to bottom from the frame of reference of FIG. 13), and a cylindrical portion 334. In particular, the dome portion 322 is positioned between the piston 22 and the bumper 294, the upper flat portion 326 extends between the dome portion 322 and the tapering portion 330, the tapering portion 330 extends between the cylindrical portion 334 and the flat portion 326, and the cylindrical portion 334 is positioned between the bumper 294 and the housing 50. In the illustrated embodiment, the cylindrical portion 334 of the conical washer 298 has an outer diameter nominally less than the inner diameter of the recess 302, thereby constraining movement of the washer 298 within the recess 302 to a single degree of freedom (i.e., translation or sliding in a vertical direction from the frame of reference of FIG. 13).

During operation of the driver 10, the conical washer 298 facilitates distribution of the impact force from the piston 22 across the entire width of the bumper 294 while also ensuring that the impact force from the piston 22 is applied transversely to the bumper 294 as a result of the cylindrical portion 334 of the washer 298 limiting its movement to translation within the recess 302. In other words, the cylindrical portion 334 prevents the washer 298 from becoming skewed within the recess 302, which might otherwise result in a non-uniform distribution of impact forces applied to the bumper 294. In the illustrated embodiment, the conical washer 298 is made from a plastic or elastomeric material.

Figure 17:
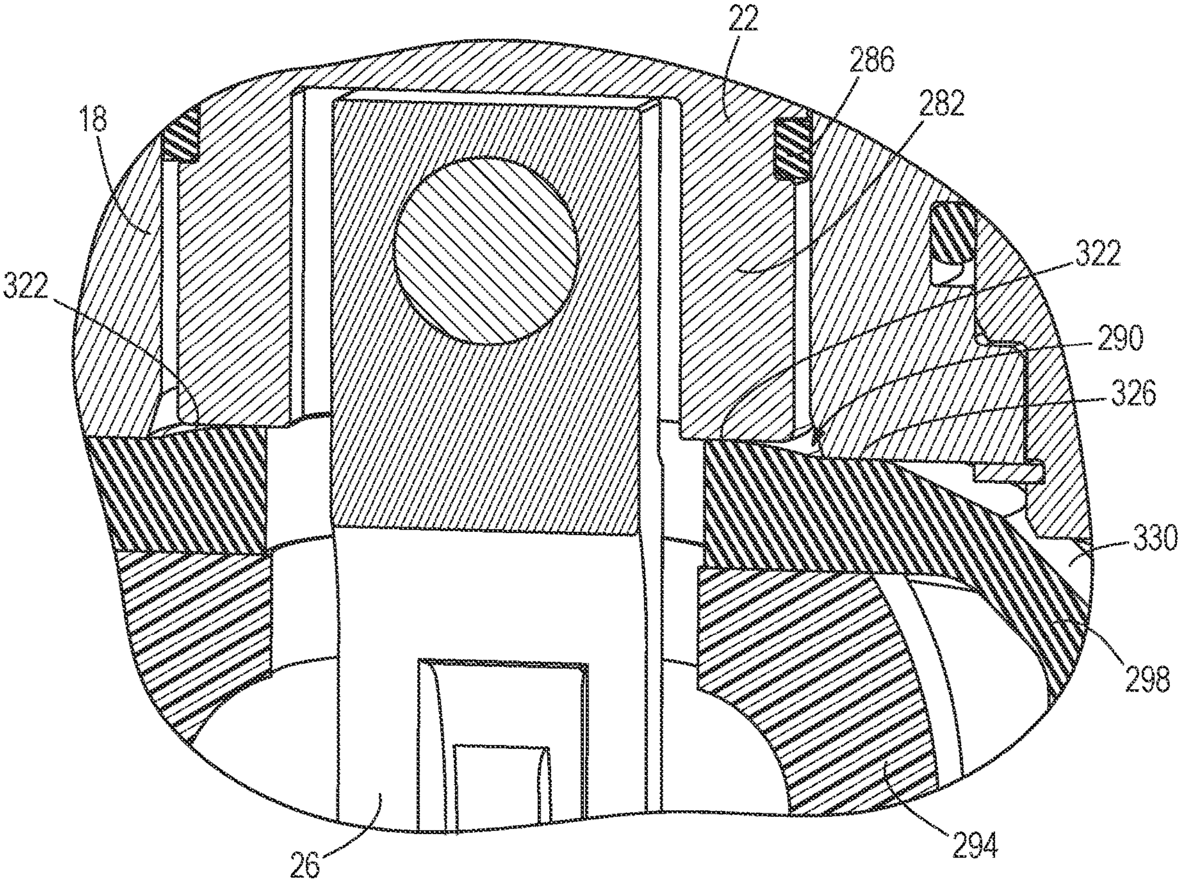
FIG. 17 is an enlarged cross-sectional view of FIG. 17, illustrating a bumper and a washer in the gas spring-powered fastener driver of FIG. 1.

With reference to FIG. 17, the dome portion 322 provides improved impact characteristics (e.g., force distribution, wear, etc.) between the piston 22 and the bumper 294. Upon initial contact between the piston 22 and the conical washer 298, the piston 22 impacts the dome portion 322 generally along a (circular) line of contact, in response to which the middle of the conical washer 298 deflects radially downward. As the impact progresses, contact between the piston 22 and the washer 298 transitions from line contact to a face contact relationship, ensuring a more even distribution of stress through the conical washer 298 and the bumper 294.

With reference to FIGS. 13-16, the operation of a firing cycle for the driver 10 is illustrated and detailed below. With reference to FIG. 13, prior to initiation of a firing cycle, the driver blade 26 is held in the ready position with the piston 22 at top dead center within the cylinder 18. More specifically, the particular pin 194 on the lifter 78 having the bearing 202 is engaged with a lower-most of the axially spaced teeth 210 on the driver blade 26, and the rotational position of the lifter 78 is maintained by the one-way clutch mechanism 114. In other words, as previously described, the one-way clutch mechanism 114 prevents the motor 46 from being back-driven by the transmission 62 when the lifter 78 is holding the driver blade 26 in the ready position. Also, in the ready position of the driver blade 26, the tip 278 of the latch 218 is received within a lower-most of the apertures 212 in the driver blade 26, though not necessarily functioning to maintain the driver blade 26 in the ready position. Rather, the latch 218 at this instant provides a safety function to prevent the driver blade 26 from inadvertently firing should the one-way clutch mechanism 114 fail.

Figure 14:
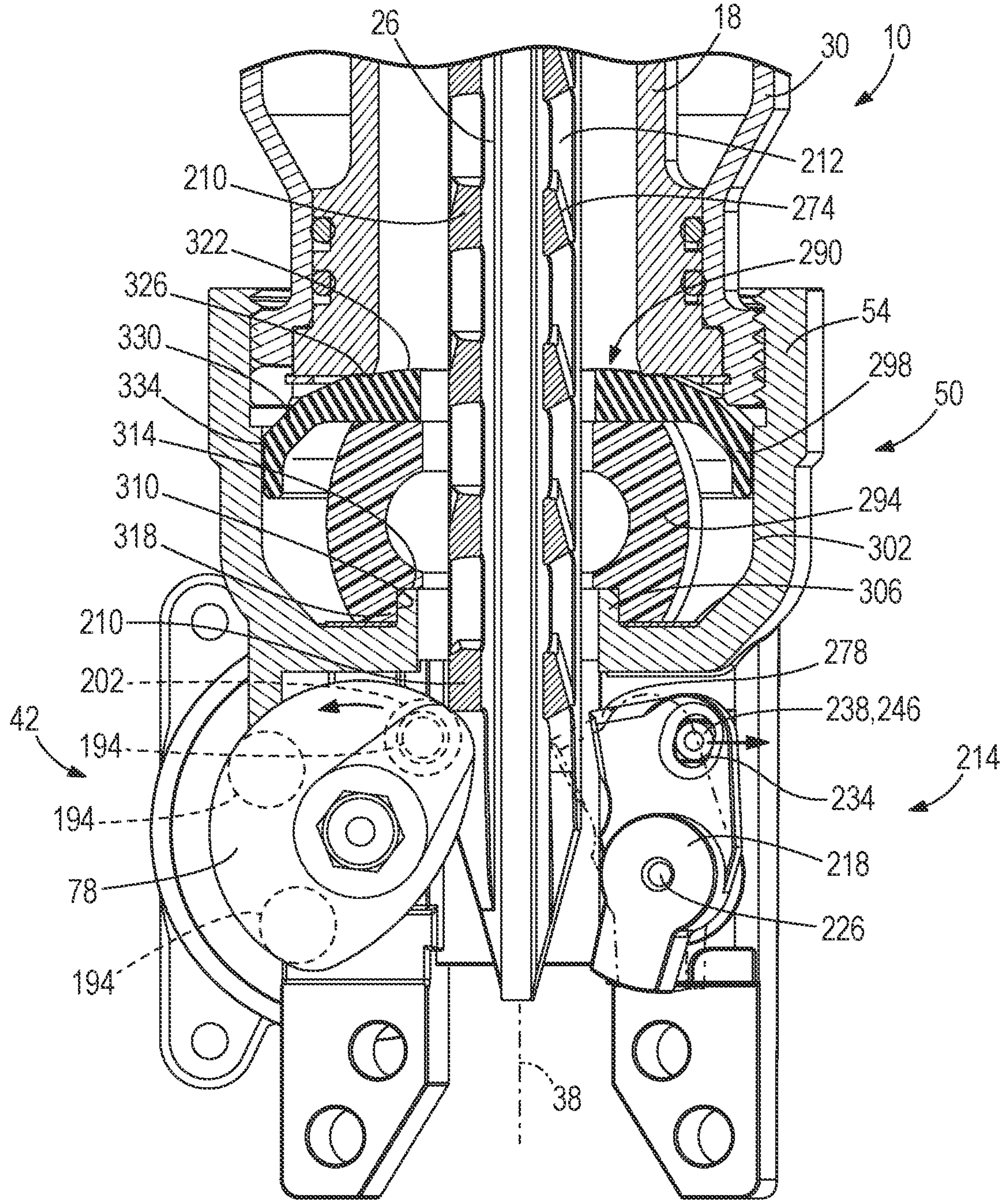
FIG. 14 is a cross-sectional view of the gas spring-powered fastener driver of FIG. 1 taken along the lines 13-13 of FIG. 5, illustrating the latch in the released state.

With reference to FIG. 14, upon the user of the driver 10 pulling the trigger 48 to initiate a firing cycle, the solenoid 222 is energized to pivot the latch 218 from the position shown in phantom lines in FIG. 14 to the position shown in solid lines in FIG. 14, thereby removing the tip 278 of the latch 218 from the lower-most aperture 212 in the driver blade 26 (defining the released state of the latch assembly 214). At about the same time, the motor 46 is activated to rotate the transmission output shaft 74 and the lifter 78 in a counter-clockwise direction from the frame of reference of FIG. 14, thereby displacing the driver blade 26 upward past the ready position a slight amount before the lower-most tooth 210 on the driver blade 26 with which the bearing 202 is in contact slips off the bearing 202. Because the bearing 202 is rotatable relative to the pin 194 upon which it is supported, subsequent wear to the pin 194 and the teeth 210 is reduced. Thereafter, the piston 22 and the driver blade 26 are thrust downward toward the driven position (FIG. 15) by the expanding gas in the cylinder 18 and storage chamber cylinder 30. As the driver blade 26 is displaced toward the driven position, the motor 46 remains activated to continue counter-clockwise rotation of the lifter 78.

With reference to FIG. 15, upon a fastener being driven into a workpiece, the piston 22 impacts the washer 298 which, in turn, distributes the impact force across the entire width of the bumper 294 to quickly decelerate the piston 22 and the driver blade 26, eventually stopping the piston 22 in the driven or bottom dead center position.

With reference to FIG. 16, shortly after the driver blade 26 reaches the driven position, a first of the pins 194 on the lifter 78 engages one of the teeth 210 on the driver blade 26 and continued counter-clockwise rotation of the lifter 78 raises the driver blade 26 and the piston 22 toward the ready (i.e., top dead center) position. Shortly thereafter and prior to the lifter 78 making one complete rotation, the solenoid 222 is de-energized, permitting the latch 218 to re-engage the driver blade 26 and ratchet into and out of the apertures 212 as upward displacement of the driver blade 26 continues (defining the latched state of the latch assembly 214).

After one complete rotation of the lifter 78 occurs, the latch 218 maintains the driver blade 26 in an intermediate position between the driven position and the ready position while the lifter 78 continues counter-clockwise rotation (from the frame of reference of FIG. 16) until the first of the pins 194 re-engages another of the teeth 210 on the driver blade 26. Continued rotation of the lifter 78 raises the driver blade 26 to the ready position at which time the driver 10 is ready for another firing cycle. Should the driver blade 26 seize during its return stroke (i.e., from an obstruction caused by foreign debris), the torque-limiting clutch mechanism 158 slips, diverting torque from the motor 46 to the ring gear 138 in the second planetary stage 86 and causing the ring gear 138 to rotate within the transmission housing portion 58. As a result, excess force is not applied to the driver blade 26 which might otherwise cause breakage of the lifter 78 and/or the teeth 210 on the driver blade 26.

Various features of the invention are set forth in the following claims.

The invention claimed is:

1. A gas spring-powered fastener driver comprising:

a cylinder;

a moveable piston positioned within the cylinder;

a driver blade attached to the piston and movable therewith between a ready position and a driven position;

a lifter configured to move the driver blade from the driven position to the ready position;

a transmission including an output shaft operatively coupled to the lifter to provide torque to the lifter;

an input configured to provide torque to the transmission;

a clutch positioned downstream of the input and operably coupled to the output shaft to limit an amount of torque transferred to the output shaft and the lifter, wherein, in response to an application of a reaction torque to the output shaft above a predetermined threshold, torque from the input is diverted from the output shaft via the clutch, wherein the clutch includes a ring gear and the second stage includes a carrier coupled between the output shaft and the ring gear.

2. The gas spring-powered fastener driver of claim 1, wherein the transmission includes the clutch.

3. The gas spring-powered fastener driver of claim 1, wherein the transmission includes a multi-stage planetary transmission.

4. The gas spring-powered fastener driver of claim 3, wherein the multi-stage planetary transmission includes a first stage and a second stage positioned between the first stage and the lifter, and wherein the second stage includes the clutch.

5. The gas spring-powered fastener driver of claim 4, wherein the first stage includes a one-way clutch.

6. The gas spring-powered fastener driver of claim 1, wherein the ring gear includes an annular front end having lugs defined thereon, and wherein the second clutch further includes detent members engageable with the respective lugs to inhibit rotation of the ring gear.

7. The gas spring-powered fastener driver of claim 6, wherein, in response to an application of a reaction torque to the output shaft above the predetermined threshold, torque from the input is diverted from the output shaft to the ring gear to rotate the ring gear, causing the detent members to slide over the lugs.

8. The gas spring-powered fastener driver of claim 6, wherein the clutch mechanism includes a spring to bias the detent members toward the annular front end of the ring gear.

9. The gas spring-powered fastener driver of claim 1, wherein the input includes a motor.

10. The gas spring-powered fastener driver of claim 1, wherein the transmission includes a first bearing supporting a first portion of the output shaft for rotation, a second bearing supporting a second portion of the output shaft for rotation, and wherein the gas spring-powered fastener driver further comprises a housing including a cylinder support portion in which the cylinder is received and a transmission housing portion in which the first and second bearings are received to rotatably support the output shaft.

11. The gas spring-powered fastener driver of claim 10, wherein the cylinder support portion and the transmission housing portion are integrally formed as a single piece.

12. The gas spring-powered fastener driver of claim 11, wherein the lifter includes a rotary component having a body and a plurality of pins engageable with teeth on the driver blade to return the driver blade from the driven position toward the ready position.

13. The gas spring-powered fastener driver of claim 12, wherein at least a first of the pins is movable relative to the body of the rotary component in response to contact with a corresponding tooth on the driver blade.

14. A gas spring-powered fastener driver comprising:

a cylinder;

a moveable piston positioned within the cylinder;

a driver blade attached to the piston and movable therewith between a ready position and a driven position;

a lifter configured to move the driver blade from the driven position to the ready position;

a transmission including an output shaft operatively coupled to the lifter to provide torque to the lifter;

an input coupled to the transmission to provide torque to the transmission;

a first clutch positioned downstream of the input and configured to transfer torque to the output shaft in a single rotational direction; and a second clutch positioned downstream of the input and operably coupled to the output shaft to limit an amount of torque transferred to the output shaft, wherein, in response to an application of a reaction torque to the output shaft above a predetermined threshold, torque from the motor is diverted away from the output shaft via the second clutch.

15. The gas spring-powered fastener driver of claim 14, wherein the transmission is defined by a planetary transmission having a first stage and a second stage, and wherein the first stage includes the first clutch.

16. The gas spring-powered fastener driver of claim 14, further comprising a ring gear, wherein the first clutch includes a carrier disposed in the ring gear, and wherein the first clutch includes lugs and rolling elements engageable with the lugs to permit rotation of the carrier only in the single rotational direction.

17. The gas spring-powered fastener driver of claim 14, wherein the clutch includes a ring gear and the second stage includes a carrier coupled between the output shaft and the ring gear.

18. The gas spring-powered fastener driver of claim 17, wherein the ring gear includes an annular front end having lugs defined thereon, and wherein the second clutch further includes detent members engageable with the respective lugs to inhibit rotation of the ring gear.

19. The gas spring-powered fastener driver of claim 18, wherein, in response to an application of a reaction torque to the output shaft above the predetermined threshold, torque from the input is diverted from the output shaft to the ring gear to rotate the ring gear, causing the detent members to slide over the lugs.

20. A gas spring-powered fastener driver comprising:

a cylinder;

a moveable piston positioned within the cylinder;

a driver blade attached to the piston and movable therewith between a ready position and a driven position;

a lifter configured to move the driver blade from the driven position to the ready position;

a transmission including an output shaft operatively coupled to the lifter to provide torque to the lifter;

an input configured to provide torque to the transmission;

a clutch positioned downstream of the input and operably coupled to the output shaft to limit an amount of torque transferred to the output shaft and the lifter, wherein, in response to an application of a reaction torque to the output shaft above a predetermined threshold, torque from the input is diverted from the output shaft via the clutch, wherein the transmission includes a first bearing supporting a first portion of the output shaft for rotation, a second bearing supporting a second portion of the output shaft for rotation, and wherein the gas spring-powered fastener driver further comprises a housing including a cylinder support portion in which the cylinder is received and a transmission housing portion in which the first and second bearings are received to rotatably support the output shaft.

21. The gas spring-powered fastener driver of claim 20, wherein the cylinder support portion and the transmission housing portion are integrally formed as a single piece.

22. The gas spring powered fastener driver of claim 21, wherein the lifter includes a rotary component having a body and a plurality of pins engageable with teeth on the driver blade to return the driver blade from the driven position toward the ready position.

23. The gas spring-powered fastener driver of claim 22, wherein at least a first of the pins is movable relative to the body of the rotary component in response to contact with a corresponding tooth on the driver blade.

* * * * *